US012638836B2

(12) United States Patent
Sekiguchi et al.

(10) Patent No.:  US 12,638,836 B2
(45) Date of Patent:  May 26, 2026

(54) INFORMATION PROCESSING DEVICE AND INFORMATION PROCESSING METHOD

(71) Applicant: SONY GROUP CORPORATION, Tokyo (JP)

(72) Inventors: Shunichi Sekiguchi, Tokyo (JP); Hirotaka Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 121 days.

(21) Appl. No.: 18/557,056

(22) PCT Filed: Jan. 27, 2022

(86) PCT No.: PCT/JP2022/003018
§ 371 (c)(1),
(2) Date: Oct. 25, 2023

(87) PCT Pub. No.: WO2022/239310
PCT Pub. Date: Nov. 17, 2022

(65) Prior Publication Data
US 2024/0219895 A1      Jul. 4, 2024

(30) Foreign Application Priority Data

May 14, 2021    (JP) ................................. 2021-082091

(51) Int. Cl.
*G05B 19/418*         (2006.01)
*B25J 9/16*           (2006.01)
*G05B 19/423*         (2006.01)

(52) U.S. Cl.
CPC ............ *G05B 19/423* (2013.01); *B25J 9/163* (2013.01); *B25J 9/1697* (2013.01); *G05B 2219/40391* (2013.01)

(58) Field of Classification Search
None
See application file for complete search history.

(56) References Cited

U.S. PATENT DOCUMENTS

| | | | |
|---|---|---|---|
| 2018/0222057 A1 | 8/2018 | Mizobe | |
| 2021/0073912 A1* | 3/2021 | Da Silva ................ | G06N 3/045 |
| 2022/0297303 A1* | 9/2022 | Khansari Zadeh .... | B25J 9/1661 |

FOREIGN PATENT DOCUMENTS

| | | |
|---|---|---|
| CN | 107825422 A | 3/2018 |
| JP | 2005-135095 A | 5/2005 |
| JP | 2007-276052 A | 10/2007 |

OTHER PUBLICATIONS

International Search Report and Written Opinion of PCT Application No. PCT/JP2022/003018, issued on Apr. 12, 2022, 08 pages of ISRWO.

(Continued)

*Primary Examiner* — Adam R Mott
(74) *Attorney, Agent, or Firm* — CHIP LAW GROUP

(57) ABSTRACT

Provided are a device and a method for presenting an evaluation score of teaching data and necessary teaching data to a user for performing learning processing using teaching data. A teaching data execution unit generates, as learning data, a camera-captured image corresponding to movement of a robot by a user operation based on the teaching data and movement position information of the robot, a learning processing unit executes machine learning by inputting learning data generated by the teaching data execution unit and generates a teaching data set including an image and a robot behavior rule as learning result data, a feedback information generation unit executes evaluation of teaching data by inputting the learning data generated by the teaching data execution unit and the learning result data generated by the learning processing unit, and generates and outputs numerical feedback information and visual feedback information based on an evaluation result.

9 Claims, 23 Drawing Sheets

(56) References Cited

OTHER PUBLICATIONS

Katagami, et al., "Extraction and Analysis of Adaptive Action Skills of Robot Under Social Hai", The 22nd Annual Conference of the Japanese Society for Artificial Intelligence, Jun. 11, 2008.

* cited by examiner

FIG. 3

CAMERA-CAPTURED IMAGE

100 ROBOT

120 USER (OPERATOR)

105 CAMERA

FIG. 5

REGION a

REGION b

100 ROBOT

120 USER (OPERATOR)

105 CAMERA

BOX a

*FIG. 10*

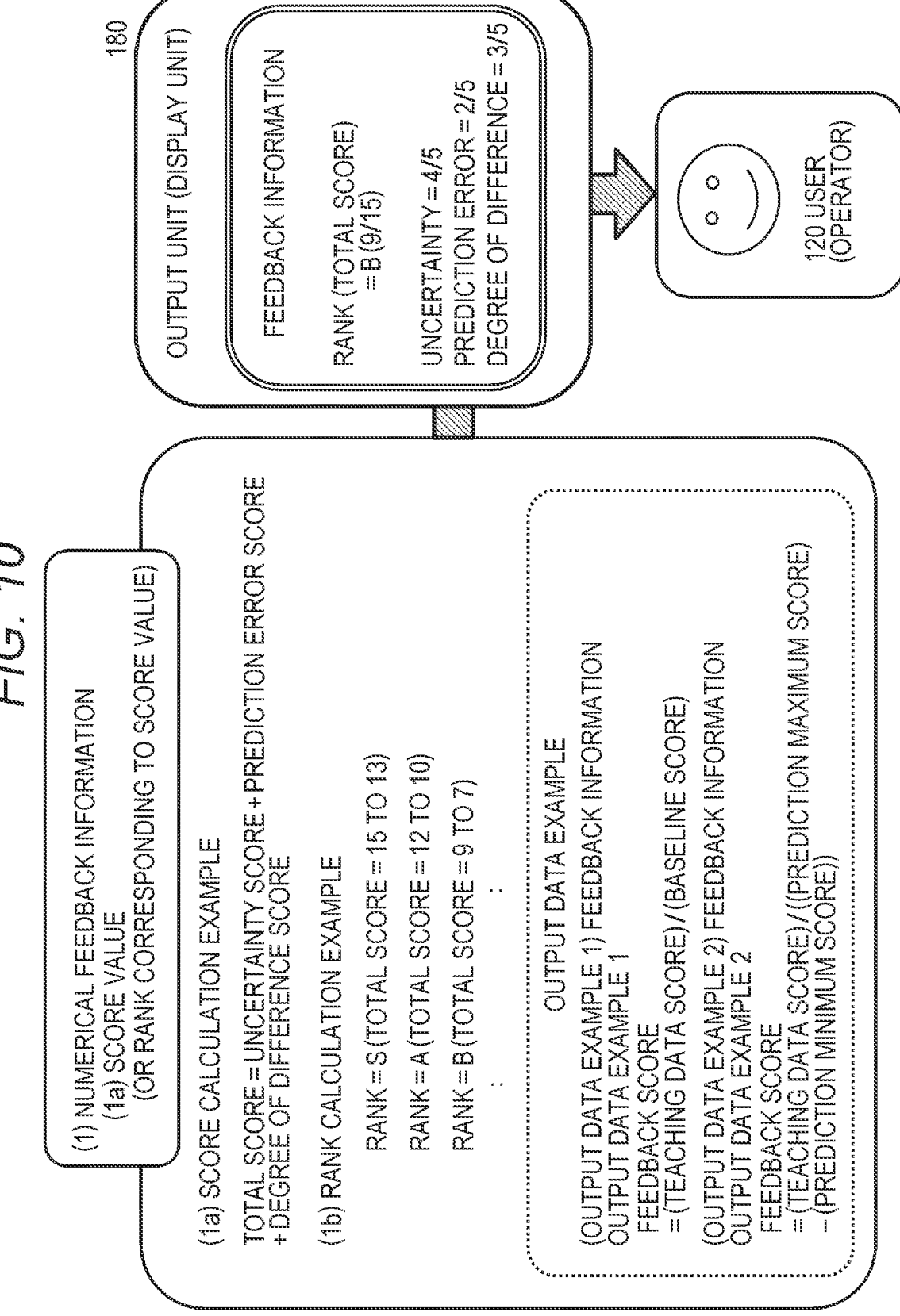

(1) NUMERICAL FEEDBACK INFORMATION
  (1a) SCORE VALUE
      (OR RANK CORRESPONDING TO SCORE VALUE)

(1a) SCORE CALCULATION EXAMPLE

TOTAL SCORE = UNCERTAINTY SCORE + PREDICTION ERROR SCORE
+ DEGREE OF DIFFERENCE SCORE (1b) RANK CALCULATION EXAMPLE

RANK = S (TOTAL SCORE = 15 TO 13)

RANK = A (TOTAL SCORE = 12 TO 10)

RANK = B (TOTAL SCORE = 9 TO 7)

⋮

OUTPUT DATA EXAMPLE (OUTPUT DATA EXAMPLE 1) FEEDBACK INFORMATION
OUTPUT DATA EXAMPLE 1
FEEDBACK SCORE
= (TEACHING DATA SCORE) / (BASELINE SCORE)

(OUTPUT DATA EXAMPLE 2) FEEDBACK INFORMATION
OUTPUT DATA EXAMPLE 2
FEEDBACK SCORE
= (TEACHING DATA SCORE) / ((PREDICTION MAXIMUM SCORE)
- (PREDICTION MINIMUM SCORE))

180

OUTPUT UNIT (DISPLAY UNIT)

FEEDBACK INFORMATION

RANK (TOTAL SCORE)
= B (9/15)

UNCERTAINTY = 4/5
PREDICTION ERROR = 2/5
DEGREE OF DIFFERENCE = 3/5

120 USER
(OPERATOR)

SCORE INDICATING "UNCERTAINTY OF BEHAVIOR RULE"

VARIANCE VALUES OF OUTPUTS OF PLURALITY OF NEURAL NETWORKS (2) VISUAL FEEDBACK INFORMATION
(2a) SCORE GRAPH DISPLAY DATA (2a1) SCORE GRAPH DISPLAY DATA EXAMPLE 1

UNCERTAINTY
PREDICTION ERROR
CAMERA-CAPTURED IMAGE (2a2) SCORE GRAPH DISPLAY DATA EXAMPLE 2

UNCERTAINTY
PREDICTION ERROR
CAMERA-CAPTURED IMAGE (2) VISUAL FEEDBACK INFORMATION
(2b) HIGH SCORE REGION INSTRUCTION DATA (2b) HIGH SCORE
REGION INSTRUCTION DATA EXAMPLE

CAMERA-CAPTURED IMAGE

HIGH SCORE REGION DIRECTION

LOW SCORE REGION DIRECTION (2) VISUAL FEEDBACK INFORMATION
(2c) SCORE CORRESPONDING COLOR DISPLAY DATA (2c) SCORE CORRESPONDING COLOR DISPLAY DATA EXAMPLE

CAMERA-CAPTURE IMAGE IS OUTPUT AS IMAGE WITH DIFFERENT COLOR ACCORDING TO SCORE VALUE

HIGH SCORE (RED IMAGE)

LOW SCORE (BLUE IMAGE)

FIG. 17

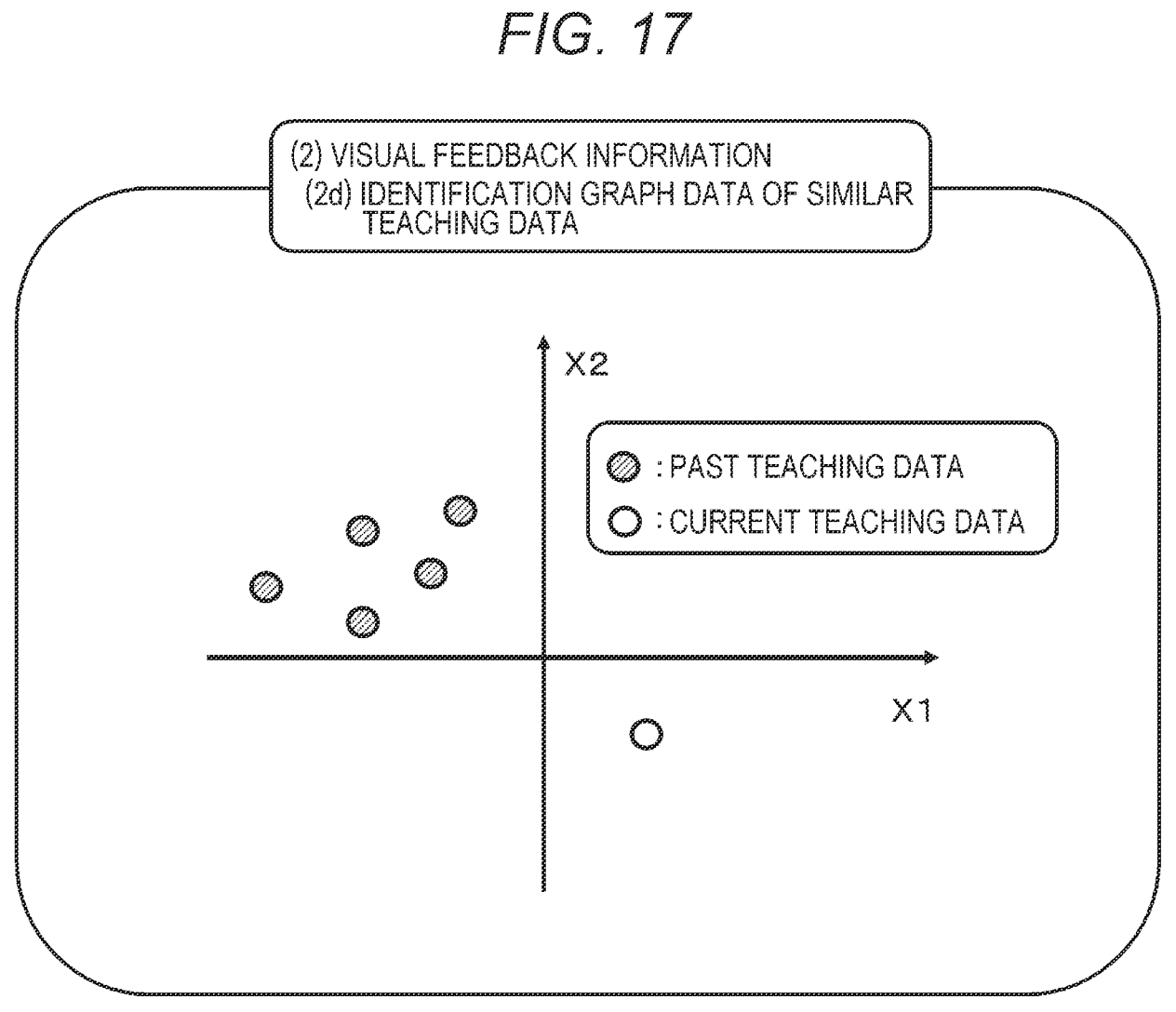

(2) VISUAL FEEDBACK INFORMATION
(2d) IDENTIFICATION GRAPH DATA OF SIMILAR TEACHING DATA

: PAST TEACHING DATA
: CURRENT TEACHING DATA

Figure 18:
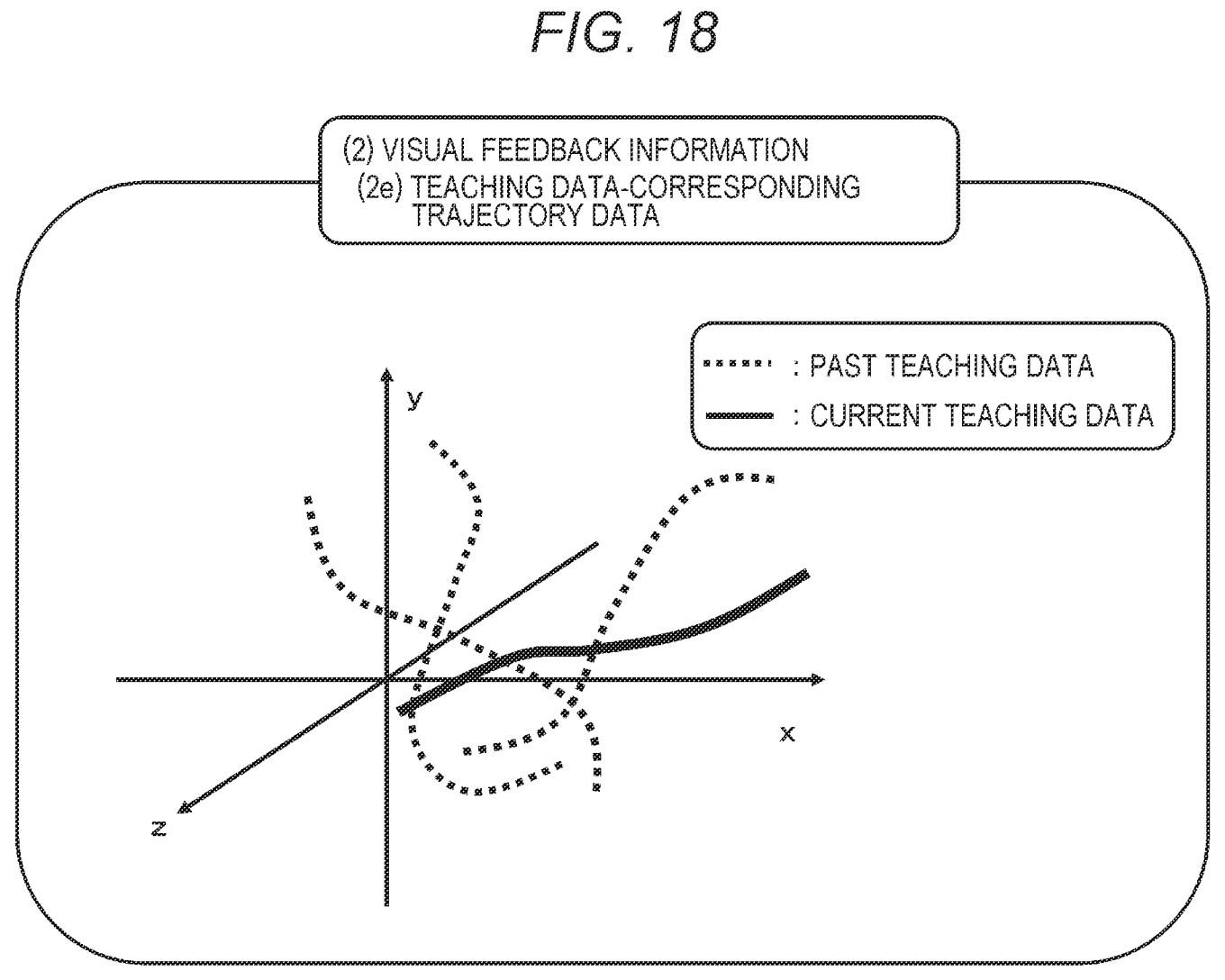

(2) VISUAL FEEDBACK INFORMATION
(2e) TEACHING DATA-CORRESPONDING
TRAJECTORY DATA

........ : PAST TEACHING DATA
———— : CURRENT TEACHING DATA

*FIG. 22*

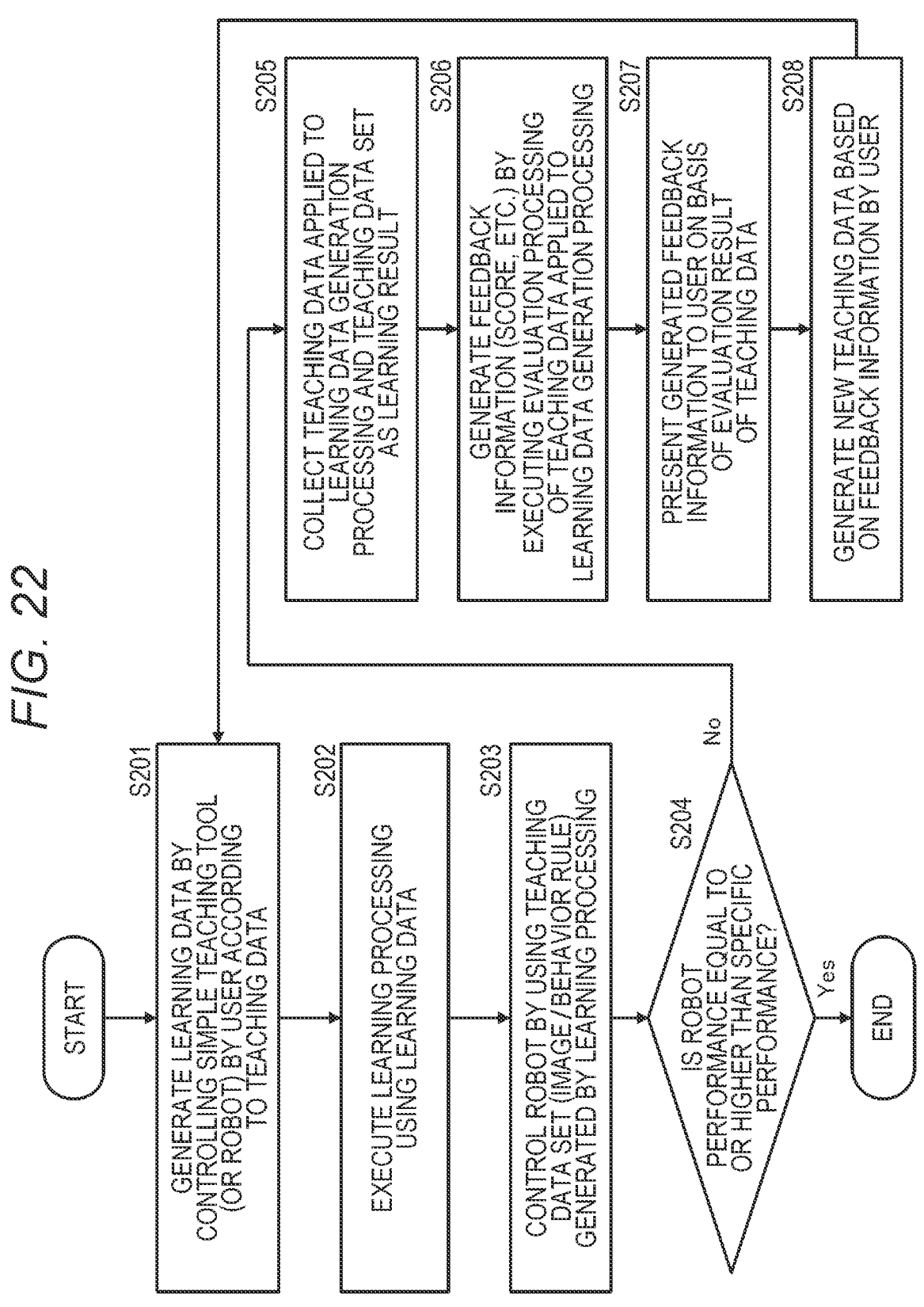

START

S201
GENERATE LEARNING DATA BY CONTROLLING SIMPLE TEACHING TOOL (OR ROBOT) BY USER ACCORDING TO TEACHING DATA

S202
EXECUTE LEARNING PROCESSING USING LEARNING DATA

S203
CONTROL ROBOT BY USING TEACHING DATA SET (IMAGE / BEHAVIOR RULE) GENERATED BY LEARNING PROCESSING

S204
IS ROBOT PERFORMANCE EQUAL TO OR HIGHER THAN SPECIFIC PERFORMANCE?

No

Yes

END

S205
COLLECT TEACHING DATA APPLIED TO LEARNING DATA GENERATION PROCESSING AND TEACHING DATA SET AS LEARNING RESULT

S206
GENERATE FEEDBACK INFORMATION (SCORE, ETC.) BY EXECUTING EVALUATION PROCESSING OF TEACHING DATA APPLIED TO LEARNING DATA GENERATION PROCESSING

S207
PRESENT GENERATED FEEDBACK INFORMATION TO USER ON BASIS OF EVALUATION RESULT OF TEACHING DATA

S208
GENERATE NEW TEACHING DATA BASED ON FEEDBACK INFORMATION BY USER

*FIG. 23*

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/003018 filed on Jan. 27, 2022, which claims priority benefit of Japanese Patent Application No. JP 2021-082091 filed in the Japan Patent Office on May 14, 2021. Each of the above-referenced applications is hereby incorporated herein by reference in its entirety.

TECHNICAL FIELD

The present disclosure relates to an information processing device, an information processing method, and a program. Specifically, the present invention relates to an information processing device, an information processing method, and a program that perform learning processing and robot control processing for causing a robot to execute a predetermined operation.

BACKGROUND ART

In recent years, the use of robots has increased in various fields.

For example, in a factory, a robot performs most of the work that has been conventionally performed by a person.

There are various types of processing performed by the robot in the factory, and as an example thereof, there is object gripping processing. As a specific example of the process using the object holding process, for example, there is a process of holding one component a from the component box, moving the component a to a predetermined position, and mounting the component a on another component b.

In order to cause the robot to accurately execute the above processing, it is necessary to control the movement of the robot with high accuracy. Learning processing is used as one method for constructing this control algorithm.

For example, by performing learning processing of analyzing an image captured by a camera mounted on a robot or fixed to a specific position of a work place, for example, an algorithm for realizing automation of the processing (task) as described above can be constructed.

However, in the learning processing, it is necessary to input a large number of pieces of sample data, for example, captured images with various different settings and analyze a large number of images, which requires a large amount of time and effort.

For example, in a case where there are a large number of deviation patterns from the assumed position and posture at the time of acquisition of the component a to be acquired, and there are also a large number of patterns of deviation in the position and posture of the component b to be mounted with the component a, a very large number of pieces of sample data (camera-captured images) are required in order to generate control information corresponding to various deviation patterns, and a considerable time is also required for the learning processing.

As one of methods for solving such a problem, imitation learning processing has been proposed in which a person creates teaching data indicating various motions of a robot and causes the robot to learn motions similar to the teaching data.

As an example of the imitation learning processing using teaching data, for example, there is a process in which a person directly moves a robot to learn ideal movements of the robot corresponding to various component positions.

When a person directly moves the robot, the robot can learn the movement.

Note that, for example, Patent Document 1 (Japanese Patent Application Laid-Open No. 2005-135095) or the like is a conventional technique that discloses learning processing using teaching data.

The learning using the teaching data is has an advantage in that, for example, it is possible to cause the robot to directly memorize a highly versatile motion, for example, a motion resistant to a change in the position of an object, without a person designing detailed rules.

However, in a case where learning processing is performed using such teaching data, for example, deep learning is performed, the performance of the robot obtained by the learning processing greatly depends on the used teaching data.

In order to improve the performance of the robot, it is necessary to create a high-quality teaching data set, that is, a teaching data set covering many regions.

For example, in a case where a process of gripping a certain component is performed, the ideal operation of the robot varies depending on the position of the component to be gripped, the direction of the component, and the like.

The robot that has learned the ideal movement according to the positions of the plurality of different components and the orientations of the components can grasp the components using the learning result.

In a case where the setting of the component position and the component direction is similar to the teaching data used in the learning processing, the robot can perform ideal movement on the basis of the knowledge obtained by the learning processing. However, in a case where the setting of the component position and the component orientation is different from the teaching data, the robot cannot perform the ideal movement only with the knowledge by the learning processing.

Therefore, in order to improve the performance of the robot, it is necessary to create a large number of pieces of teaching data with high quality, that is, covering a large number of regions, and make the robot memorize the teaching data.

However, when a person creates teaching data without any index, a region that cannot be biased or covered is generated. As a result, even if deep learning is used, versatility is lowered, and expected performance is not obtained in many cases.

In such a case, it is necessary to perform learning by further adding new teaching data. However, even if learning processing based on new teaching data is performed without any index, there is a possibility that useless processing such as learning of data similar to the already used teaching data is performed. As a result, it takes a huge amount of time to cause the robot to acquire the target performance.

This problem is referred to as Covariate Shift, and a solution has been sought for a long time.

As one of the methods showing a solution of this covariate shift, for example, there are the following methods.

There are a method of causing a robot to execute a learned behavior rule in an actual environment, and as a result, a person labels teaching data to a state in which a problem has occurred, for example, a state in which a problem has occurred, and causing the teaching data to be labeled to learn as new teaching data, and the like.

However, this approach requires a lot of effort and time to find the required teaching data.

Moreover, techniques for increasing teaching data sets in large quantities have also been proposed.

Increasing the number of teaching data sets in large amounts makes it possible to prevent data set bias and to cover a wide range of movements.

If a person creates a large number of teaching data sets directly, it is not necessary to move the actual system, so the efficiency of creating multiple types of data sets is high. However, there is no change in the necessity of exploratory creation of many types of teaching data sets, and there is a problem that labor and time cannot be greatly reduced.

CITATION LIST

Patent Document

PATENT DOCUMENT 1: Japanese Patent Application Laid-Open No. 2005-135095

SUMMARY OF THE INVENTION

Problems to be Solved by the Invention

The present disclosure has been made in view of the above problems, for example, and an object of the present disclosure is to provide an information processing device, an information processing method, and a program that enable, in a configuration in which a robot learns motion using teaching data, a robot to efficiently create various types of effective teaching data and learn the teaching data, and to efficiently improve robot performance.

Solutions to Problems

A first aspect of the present disclosure is an information processing device including:

a teaching data execution unit that generates, as learning data, a camera-captured image corresponding to movement of a robot by a user operation based on teaching data and movement position information of the robot;

a learning processing unit that executes machine learning processing by inputting learning data generated by the teaching data execution unit and generates a teaching data set including correspondence data between an image and a behavior rule of a robot as learning result data; and a feedback information generation unit that inputs learning data generated by the teaching data execution unit and learning result data generated by the learning processing unit, executes evaluation of teaching data applied to the user operation executed in the teaching data execution unit, generates feedback information based on an evaluation result, and outputs the feedback information to an output unit.

Moreover, a second aspect of the present disclosure is an information processing method executed in an information processing device, the method including:

teaching data execution step of generating, by a teaching data execution unit, a camera-captured image corresponding to movement of a robot by a user operation based on teaching data and movement position information of the robot as learning data;

learning processing step of executing, by a learning processing unit, machine learning processing by inputting learning data generated by the teaching data execution unit and generating a teaching data set including correspondence data between an image and a behavior rule of a robot as learning result data; and feedback information generation step of executing, by a feedback information generation unit, evaluation of teaching data applied to the user operation executed in the teaching data execution unit by inputting learning data generated by the teaching data execution unit and learning result data generated by the learning processing unit, generating feedback information based on an evaluation result, and outputting the feedback information to an output unit.

Moreover, a third aspect of the present disclosure is a program for causing an information processing device to execute information processing, including:

teaching data execution step of causing a teaching data execution unit to generate, as learning data, a camera-captured image corresponding to movement of a robot by a user operation based on teaching data and movement position information of the robot;

learning processing step of causing a learning processing unit to execute machine learning processing by inputting learning data generated by the teaching data execution unit and to generate a teaching data set including correspondence data between an image and a behavior rule of a robot as learning result data; and feedback information generation step of causing a feedback information generation unit to execute evaluation of teaching data applied to the user operation executed in the teaching data execution unit by inputting learning data generated by the teaching data execution unit and learning result data generated by the learning processing unit, to generate feedback information based on an evaluation result, and to output the feedback information to an output unit.

Note that a program of the present disclosure is a program that can be provided by, for example, a storage medium or a communication medium provided in a computer-readable format to an information processing device or a computer system that can execute various program codes. By providing such a program in a computer-readable format, processing corresponding to the program is implemented on the information processing device or the computer system.

Other objects, features, and advantages of the present disclosure will become apparent from a more detailed description based on embodiments of the present disclosure described below and the accompanying drawings. Note that a system in the present specification is a logical set configuration of a plurality of devices, and is not limited to one in which devices with respective configurations are in the same housing.

According to the configuration of one embodiment of the present disclosure, in the configuration for performing the learning processing using the teaching data, the device and the method for presenting the evaluation score of the teaching data and the necessary teaching data to the user in an easy-to-understand manner are realized, and the efficient learning processing and the improvement of the robot performance can be performed.

Specifically, for example, the teaching data execution unit generates, as the learning data, a camera-captured image corresponding to the motion of the robot by the user operation based on the teaching data and the movement position information of the robot, the learning processing unit inputs the learning data generated by the teaching data execution unit to execute the machine learning and generates the teaching data set including the image and the robot behavior rule as the learning result data, the feedback information generation unit inputs the learning data generated by the teaching data execution unit and the learning result data generated by the learning processing unit to execute the evaluation of the teaching data, and generates and outputs the numerical feedback information and the visual feedback information based on the evaluation result.

According to this configuration, in the configuration for performing the learning processing using the teaching data, the device and the method for presenting the evaluation score of the teaching data and the necessary teaching data to the user in an easy-to-understand manner are realized, and efficient learning processing and improvement of robot performance can be performed.

Note that the effects described herein are only examples and are not limited thereto, and additional effects may also be present.

BRIEF DESCRIPTION OF DRAWINGS

FIG. 3 is a diagram for explaining an example of learning processing using teaching data by a user operation on a robot.

FIG. 5 is a diagram for explaining an example in which teaching data corresponding to a specific component position or component posture cannot be created.

FIG. 10 is a diagram for explaining a specific example of feedback information generated by a feedback information generation unit.

FIG. 17 is a diagram for explaining a specific example of feedback information generated by a feedback information generation unit.

FIG. 18 is a diagram for explaining a specific example of feedback information generated by a feedback information generation unit.

FIG. 22 is a diagram illustrating a flowchart for explaining a sequence of processing executed by the information processing device of the present disclosure.

FIG. 23 is a diagram for explaining a hardware configuration example of the information processing device according to the present disclosure.

MODE FOR CARRYING OUT THE INVENTION

Hereinafter, an information processing device, information processing method, and program according to the present disclosure will be described in detail with reference to the drawings. Note that the description will be given according to the following items.

1. Example of robot control processing
  2. Learning processing using teaching data for construction of robot control algorithm
  3. Overview of processing executed by information processing device according to present disclosure
  4. Specific example of processing executed by information processing device of present disclosure
  5. Example of display data in output unit
  6. Configuration example of information processing device according to present disclosure
  7. Sequences of processing executed by information processing device according to present disclosure
  8. Hardware configuration example of information processing device of present disclosure
  9. Summary of configuration of present disclosure 1. Example of Robot Control Processing First, an example of robot control processing will be described with reference to FIG. 1 and subsequent drawings.

Figure 1:
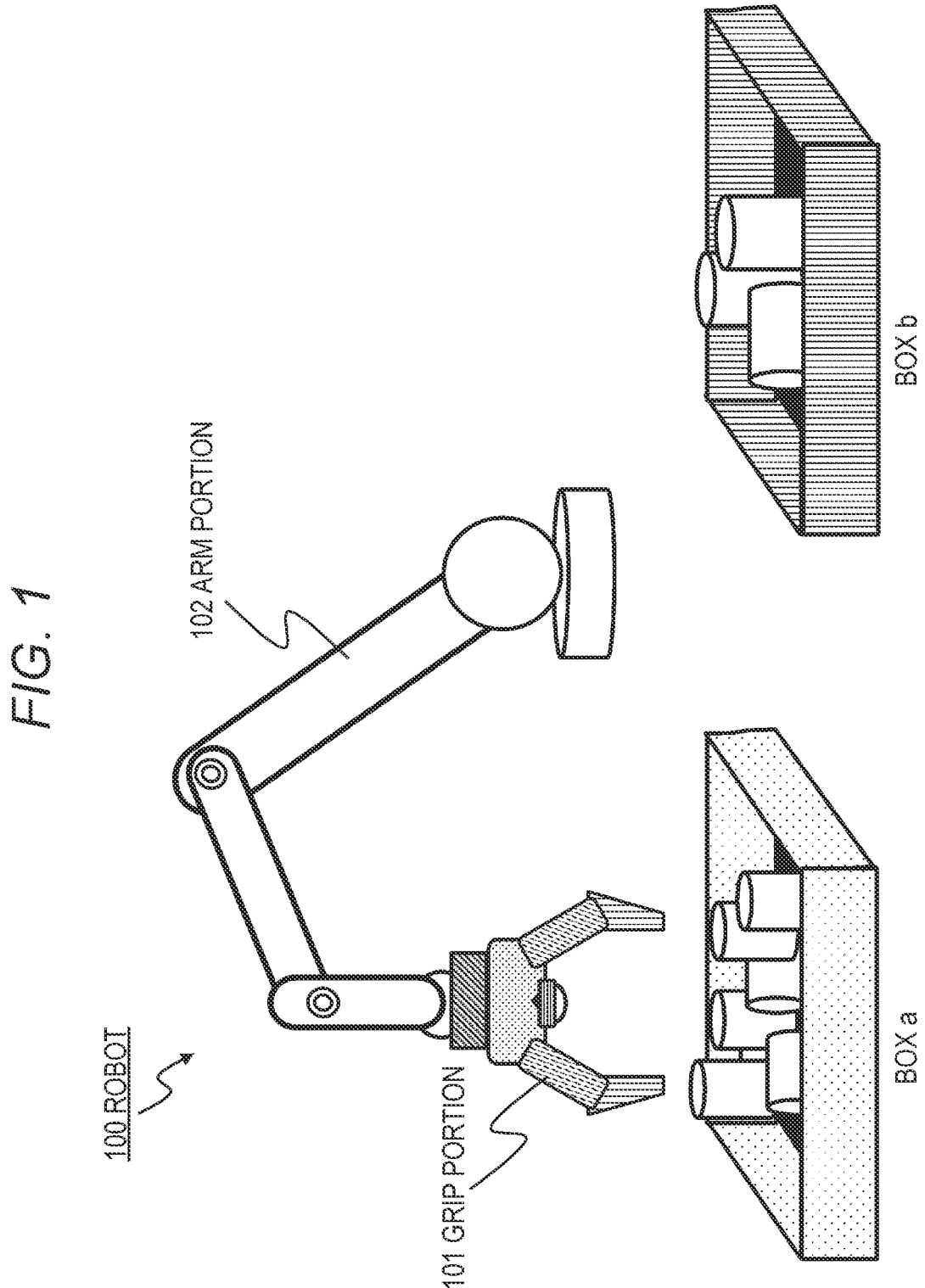
FIG. 1 is a diagram for explaining an example of operation of a robot and control processing.

FIG. 1 is a diagram illustrating an example of processing executed by a robot 100.

A box a contains a large number of components. The robot 100 performs a process of gripping one component from the box a with a grip portion 101 at the distal end of the robot, moving the grip portion 101 to the position of a box b by rotating an arm portion 102, and placing the gripped component in the box b.

A processing sequence in a case where the robot 100 performs processing of taking out a component from the box a and placing the component in the box b in this manner will be described with reference to FIG. 2.

Figure 2:
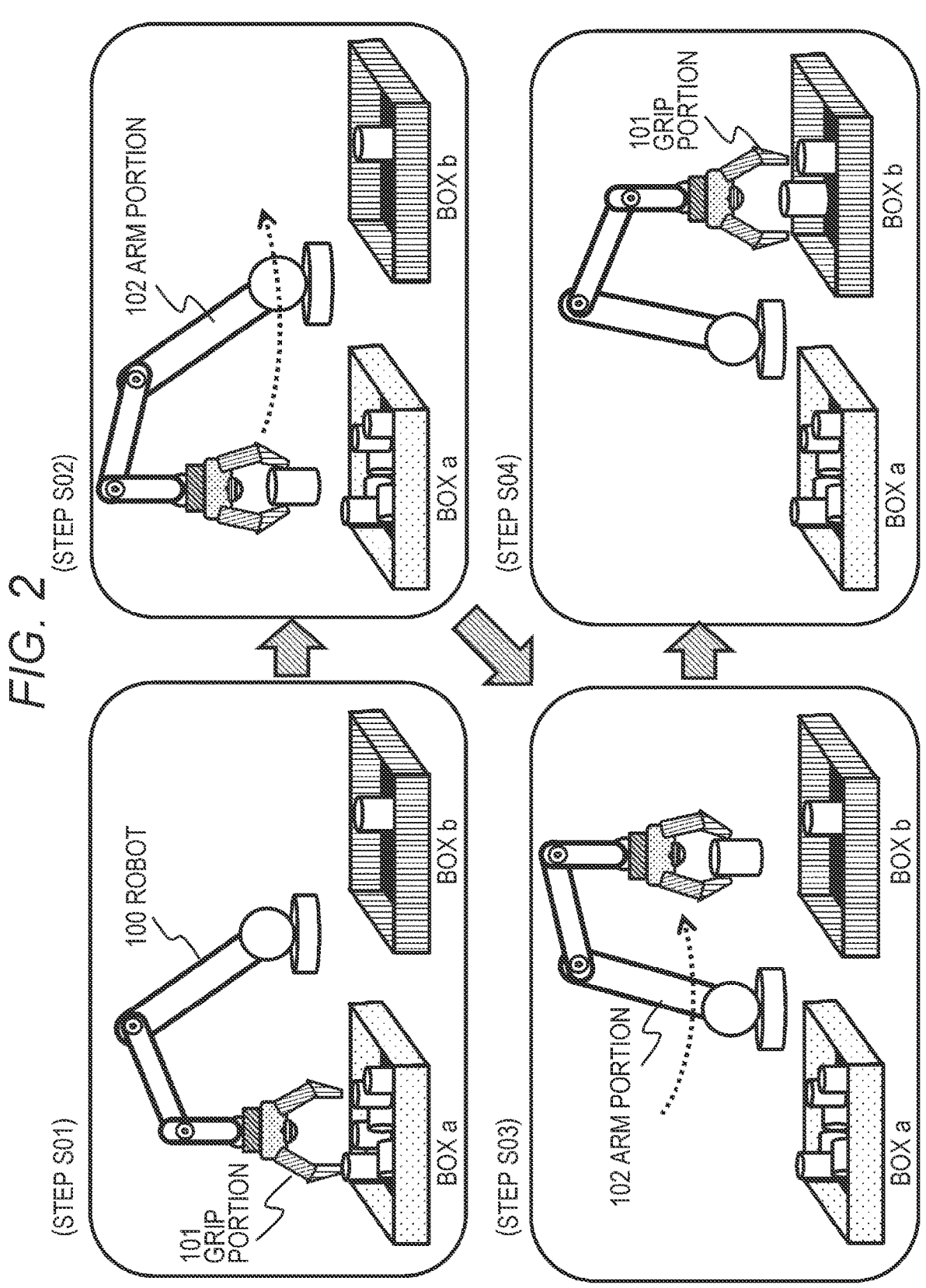
FIG. 2 is a diagram for explaining an example of operation of a robot and control processing.

The robot 100 executes the following processing in the order of steps S01 to S04 illustrated in FIG. 2.

(Step S01)

First, in step S01, the robot 100 selects one component to be gripped from the box a, and moves the grip portion 101 to a position where the selected component can be gripped.

(Step S102)

Next, in step S02, the robot 100 drives the grip portion 101 to grip and lift up the selected component.

(Step S03)

Thereafter, in step S03, the robot 100 rotates the arm portion 102 while gripping the component by the grip portion 101, and moves the grip portion 101 to above the box b.

(Step S04)

Thereafter, in step S04, the robot 100 lowers the grip portion 101 gripping the component to approach the box b, releases the component gripping state of the grip portion 101, separates the component from the grip portion 101, and puts the component into the box b.

However, in a case where the robot 100 performs an operation of gripping and moving the component according to these sequences, the robot 100 is required to perform a different operation for each component.

For example, in a case where a component picking process of acquiring one component from the box a is performed, the robot 100 needs to perform the movement and the grasping process in different modes according to the position and orientation of the component.

Moreover, also when placing a component in the box b, different processes are required depending on the position of the component already in the box b.

Therefore, in order to accurately execute the processes in the above-described steps S01 to S04 for each component, robot control assuming all various states is required.

The learning processing is effective as a process for performing different robot control according to such each state.

Hereinafter, an example of learning processing for robot control will be described.

2. Learning Processing Using Teaching Data for Constructing Robot Control Algorithm Next, learning processing using teaching data for constructing a robot control algorithm will be described.

It is possible to construct a control algorithm that realizes automation of processing as described with reference to FIGS. 1 and 2, for example, by performing learning processing of analyzing a captured image of a camera mounted on the robot or a camera fixed to a specific position of a work place during execution of an operation by the robot.

However, a large amount of sample data is required for the learning processing. For example, it is necessary to perform processing of capturing and analyzing a large number of images for gripping components at various different positions and postures, which requires a large amount of time and effort.

For example, in a case where there are a large number of patterns of the position and posture of the component to be gripped, it is necessary to generate control information corresponding to various patterns, and for this purpose, a large pieces of sample data (camera-captured images) corresponding to each pattern is required, and a considerable time is also required for the learning processing.

As one of methods for solving such a problem, learning processing (imitation learning processing) has been proposed in which a person creates teaching data indicating various motions of a robot and causes the robot to learn motions similar to the teaching data.

The learning processing using the teaching data is, for example, learning processing in which a person directly operates the grip portion or the arm portion of the robot to actually perform ideal movements of the robot corresponding to various component positions and stores the trajectory and the like. Note that it is also possible for a person to move the robot using the controller to cause the robot to store the movement.

In this manner, when a person moves the robot, the robot can learn the movement.

Figure 3:
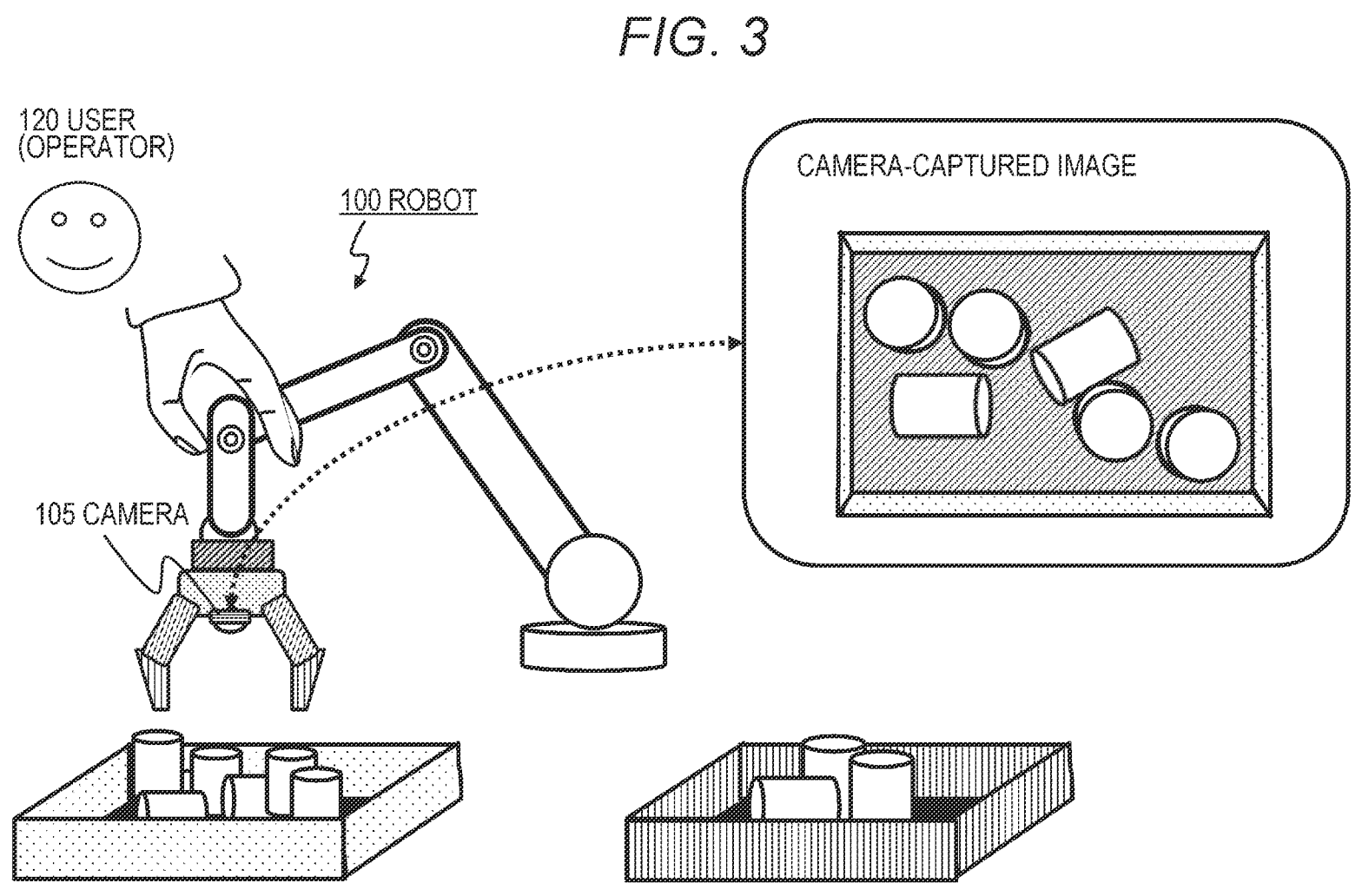

For example, as illustrated in FIG. 3, a user (operator) 120 directly moves the robot 100. During the operation of the robot 100, the camera 105 attached to the grip portion 101 of the robot 100 captures an image of the grip portion 105 in the downward direction.

Figure 4:
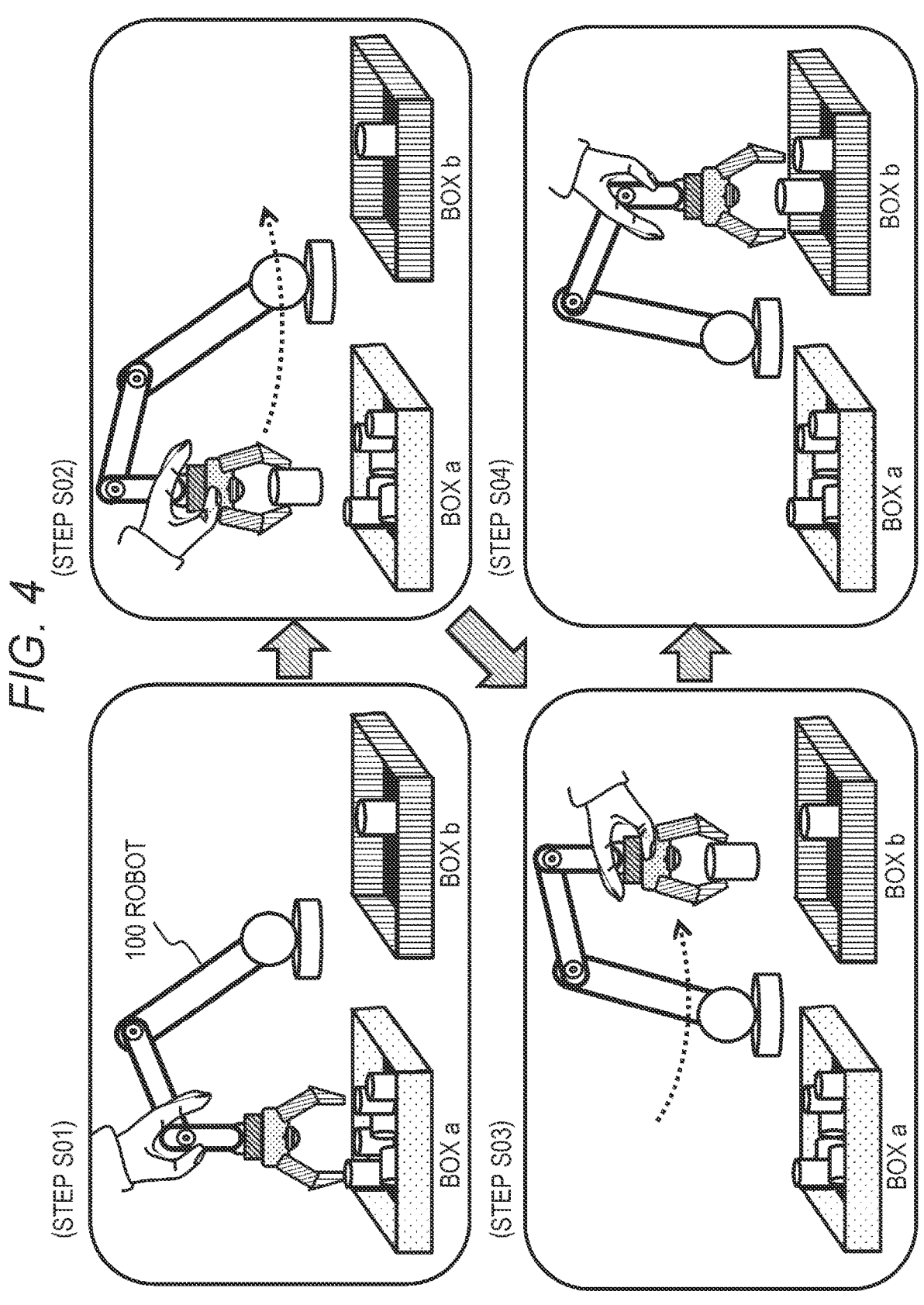
FIG. 4 is a diagram for explaining an example of learning processing using teaching data by a user operation on a robot.

For example, as illustrated in FIG. 4, the movement in steps S01 to S04 described above with reference to FIG. 2 is executed under the operation of the user, and a series of images is captured.

Learning processing is performed using the captured image.

When the user 120 moves the robot 100, the captured images are sequentially updated. An information processing device in the robot 100 or an information processing device that receives an image from the robot 100 and performs analysis can analyze a captured image and generate correspondence data between a series of movements of the robot 100 and a change sequence of the captured image.

That is, by the learning processing, it is possible to generate a captured image, a behavior rule of the robot 100, and a data set (=learning result data) including a combination of these data.

This data set is referred to as the "teaching data set".

As a result of the learning processing, a large number of teaching data sets (=learning result data) including combinations of "behavior rules" corresponding to "captured images" corresponding to various component positions are generated.

After the completion of learning processing, the robot 100 is controlled using the teaching data set (=learning result data), so that the robot 100 can reliably grip components at various positions.

That is, by selecting a captured image to be maintained on the path in the captured image of the camera mounted on the robot 100 from the teaching data set (=learning result data) and operating the robot 100 according to the "behavior rule" corresponding to the "captured image" of the selected teaching data set, it is possible to cause the robot 100 to perform a motion similar to the motion operated by the user at the time of the learning processing.

An advantage of the learning using the teaching data is that, for example, it is possible to cause the robot to directly memorize a highly versatile motion, for example, a motion resistant to a change in the position of an object, without a person designing detailed rules.

In the case of machine learning, particularly deep learning, to which such teaching data is applied is performed, the performance of the robot obtained by the learning greatly depends on the used teaching data.

In order to improve the performance of the robot, it is necessary to create a high-quality teaching data set, that is, a teaching data set covering many regions, and make the robot memorize the teaching data set.

However, when a person creates teaching data without any index, a region that cannot be biased or covered is generated. Specifically, for example, there arises a problem that teaching data corresponding to a specific component position or component posture cannot be created.

Figure 5:
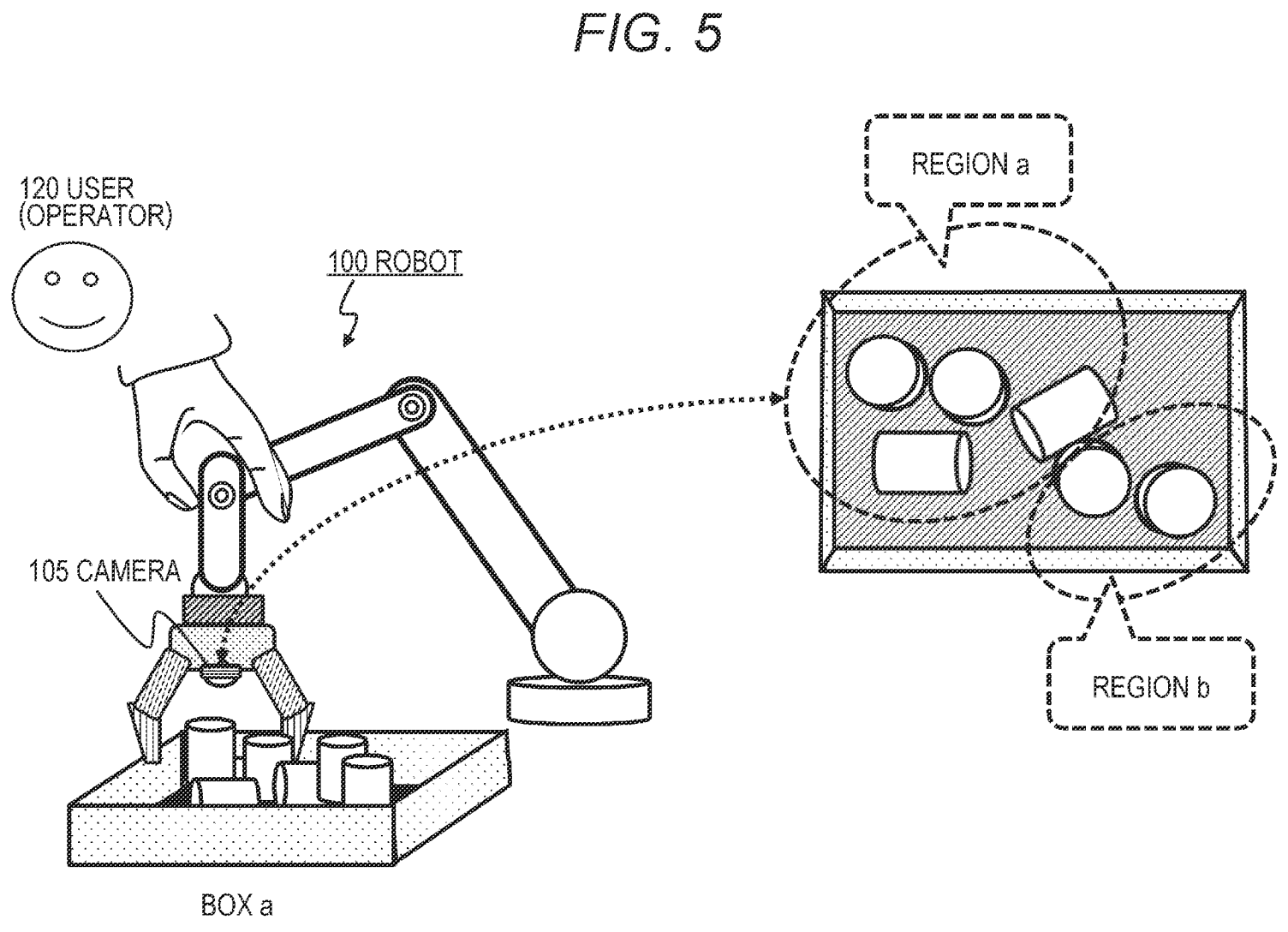

For example, as illustrated in FIG. 5, when the user 120 repeatedly executes the operation of causing the robot 100 to grip a component in a specific region of the box a, that is, in the vicinity of the region a illustrated in the upper right to perform the learning processing, many teaching data sets as learning result data for gripping a component in the region a are created by the learning processing based on the teaching data in the region a.

However, if the user 120 does not operate the robot 100 in the region b, the learning processing based on the teaching data corresponding to the region b is not performed, and the teaching data set as the learning result data for gripping a component in the region b is hardly created.

As a result, in a case where the robot 100 is controlled using the teaching data set obtained as the learning processing result, it is possible to perform good control using the teaching data set included in the learning result in the processing of grasping the component in the region a, but it is difficult to perform good control using the teaching data set included in the learning result in the processing of grasping the component in the region b.

In this way, if the learning processing is performed using insufficient teaching data, it is difficult to perform control corresponding to a specific component position even if deep learning is used. As a result, versatility is deteriorated, and expected robot performance cannot be realized.

As mentioned above, this problem is referred to as Covariate Shift, and a solution has been sought for a long time.

For example, there are a method of causing a robot to execute a learned behavior rule in an actual environment, and as a result, a person labels teaching data to a state in which a problem has occurred, for example, a state in which a problem has occurred, and causing the teaching data to be labeled to learn as new teaching data, a method of increasing the number of teaching data sets, and the like.

However, these methods require much labor and time to find necessary teaching data, and there is a problem that labor and time cannot be greatly reduced.

3. Overview of Processing Executed by Information Processing Device According to Present Disclosure Next, an outline of processing executed by the information processing device of the present disclosure will be described.

The present disclosure has been made in view of the above problems, for example, and makes it possible to efficiently create various types of effective teaching data in a case where a robot is caused to learn motion using teaching data.

That is, it is possible to efficiently create effective teaching data without excess or deficiency by reducing the possibility of occurrence of deviation or an uncovered region.

It is possible to efficiently and reliably improve the performance of the robot by performing learning processing using effective teaching data without excess or deficiency.

For example, the information processing device of the present disclosure generates and presents feedback information for a user (operator) who moves a robot according to teaching data. For example, numerical feedback information such as a score that is an evaluation value of the teaching data executed by the user or visual feedback information is generated and presented.

The user (operator) can easily determine what kind of teaching data is necessary as new teaching data by referring to the feedback information generated by the information processing device of the present disclosure.

Note that the feedback information generated by the information processing device of the present disclosure and presented to the user is created using uncertainty of the behavior rule obtained as a result of the learning processing, a loss of the behavior rule (prediction error from the teaching data set), latent feature data obtained by analyzing the camera-captured image, and the like.

Note that the latent feature data is feature data obtained by compressing and simplifying the feature data included in the original data. For example, the feature data obtained from the captured image of the camera includes a large number of pieces of data such as the size (height, width) of the image, the object distance, the color in units of pixels, and the luminance, and when all of them are to be output, the feature data becomes enormous data of several 100 dimensions, and analysis processing requires enormous time. Data generated by compressing such enormous data into a vector of several dimensions such as 64 dimensions, 32 dimensions, 2 dimensions, or 3 dimensions is latent feature data. By performing analysis using latent feature data, efficient analysis can be performed.

As described above, the latent feature data is feature data obtained by compressing and simplifying the feature data included in the original data, and the information processing device of the present disclosure generates two pieces of feedback information including numerical feedback information such as a score that is an evaluation value of teaching data to be presented to the user using the latent feature data and visual feedback information.

The information processing device of the present disclosure solves a problem of learning processing using conventional teaching data, that is, a problem that deviation occurs in teaching data generated by a person and an uncovered region occurs.

Specifically, for example, a process of generating visual feedback information or numerical feedback information that allows the user to confirm new teaching data to be generated, teaching data corresponding to a region difficult to learn, or the like, and presenting the visual feedback information or the numerical feedback information to the user is executed.

Hereinafter, a specific example of the feedback information generated by the information processing device of the present disclosure and provided to the user will be described.

(1) Numerical Feedback Information

The numerical feedback information is, for example, an evaluation value of teaching data executed by the user.

A score calculated on the basis of a predefined reference value, for example, a five-grade score such as score=1, 2, 3, 4, and 5 as a five-grade evaluation value is generated and presented.

Note that the five grades are an example, and a configuration using scores of a plurality of grades of at least two or more grades is possible.

By using such a score, it is possible to provide the user with easily understandable feedback information.

Note that specific examples of the score generation processing and the presentation processing will be described later.

(2) Visual Feedback Information

The visual feedback information includes the following plurality of pieces of information:

(2a) Score graph display data (2b) High score region instruction data (2c) Score corresponding color display data (2d) Identification graph data of similar teaching data (2e) Teaching data-corresponding trajectory data The visual feedback information generated by the information processing device of the present disclosure and presented to the user includes a plurality of pieces of information.

Hereinafter, an outline of each piece of information will be described. Note that a specific example of the visual feedback information described below will be described later.

(2a) Score Graph Display Data

The score graph display data is, for example, graphic data such as a bar graph corresponding to the score, and is data in which the evaluation value of the teaching data executed by the user is set as easy-to-understand visual information. For example, a bar graph or the number of stars ★★☆☆☆ or the like) corresponding to the score that is the numerical feedback information is output.

Therefore, the user can immediately confirm whether or not the score of the teaching data executed by the user is high or low.

(2b) High Score Region Instruction Data

The high score region instruction data is, for example, data in which a mark such as an arrow indicating a region in which teaching data with a high score can be generated is displayed on a camera-captured image.

When outputting the captured image of the camera attached to the robot to the display unit, a mark such as an arrow indicating a region where teaching data with a high score can be generated is displayed on the display image.

Therefore, the user can confirm the position, trajectory, and the like of the teaching data to be newly generated.

(2c) Score Corresponding Color Display Data

The score corresponding color display data is display data of the camera-captured image that outputs the score correspondence color.

When the captured image of the camera attached to the robot is output to the display unit, the color of the display image is set to a different color according to the score that is the numerical feedback information. For example, a blue image is set in a case where the score is low, and a red image is set in a case where the score is high.

Therefore, the user can immediately confirm whether or not the score of the teaching data executed by the user is high or low.

(2d) Identification Graph Data of Similar Teaching Data

The identification graph data of the similar teaching data is comparison data of the feature data acquired from the camera-captured image according to the trajectory of the robot according to the teaching data newly executed by the user and the feature data obtained from the camera-captured image corresponding to the already executed teaching data.

Comparison data between teaching data newly executed by the user and teaching data already executed is generated and displayed.

For example, comparison data of the feature data obtained from the camera-captured image according to the trajectory of the robot according to the teaching data newly executed by the user and the feature data acquired from the camera-captured image corresponding to the already executed teaching data is generated and displayed.

Note that the display data is compressed and displayed as latent feature data of several dimensions for easy understanding.

Therefore, the user can easily confirm whether or not the newly executed teaching data is similar to the executed teaching data.

(2e) Teaching Data-Corresponding Trajectory Data

The teaching data-corresponding trajectory data is obtained by generating and displaying comparison data between a trajectory (for example, a grip position) of the robot based on the teaching data newly executed by the user and a trajectory (for example, a grip position) of the robot based on the teaching data already executed.

Comparison data between a trajectory (for example, a grip position) of the robot based on the teaching data newly executed by the user and a trajectory (for example, a grip position) of the robot based on the teaching data already executed is generated and displayed.

For example, trajectory data is drawn and displayed on a three-dimensional graph.

Therefore, the user can easily confirm whether or not the trajectory of the newly executed teaching data is similar to the trajectory of the executed teaching data.

Note that a specific example of the visual feedback information described above will be described later.

As described above, the information processing device of the present disclosure executes processing of generating visual feedback information or numerical feedback information that can be confirmed by the user and presenting the visual feedback information or the numerical feedback information to the user.

By confirming the presentation information, the user can easily confirm new teaching data to be generated, teaching data corresponding to a region where learning is difficult, and the like.

As a result, an effective teaching data set can be efficiently collected by learning processing using proper teaching data corresponding to a motion desired to be taught to the robot (for example, an object holding operation), and a behavior rule as a learning processing result can be efficiently generated.

4. Specific Example of Processing Executed by Information Processing Device of Present Disclosure Next, a specific example of processing executed by the information processing device of the present disclosure will be described.

Hereinafter, a generation and output processing example of feedback information executed by the information processing device of the present disclosure, that is, a generation and output process example of feedback information in a case where the learning processing for generating a teaching data set (a camera-captured image and a behavior rule) to be used for control of a robot by a user (operator) operating the robot by applying teaching data will be described.

Hereinafter, as a specific example of the processing, a processing example in a case where the user (operator) learns the object holding operation using a simple teaching tool instead of the robot will be described.

The simple teaching tool is a simple tool that enables movement similar to that of an actual robot, and is a small device that can be easily operated by a user.

Note that the processing may be performed using a robot to be actually controlled instead of the simple teaching tool.

In the following description, a case of teaching a pick and place task of moving an object in a certain box A to a box B will be described as a model case.

Note that the processing of the present disclosure is not limited to the specific example described below, and can be applied to general learning processing using teaching data.

For example, the processing of the present disclosure is also applicable to teaching processing of a teaching pendant type in which a robot is caused to execute actual movement using a controller or the like to sequentially store positions, movements, and the like of an arm portion and a grip portion, processing in which a person directly moves a robot arm or the like to teach, and the like.

Furthermore, an operation (task) to be executed by the robot is not limited to the grasping operation.

Next, with reference to FIG. 6, an outline of processing executed by the information processing device of the present disclosure will be described.

Figure 6:
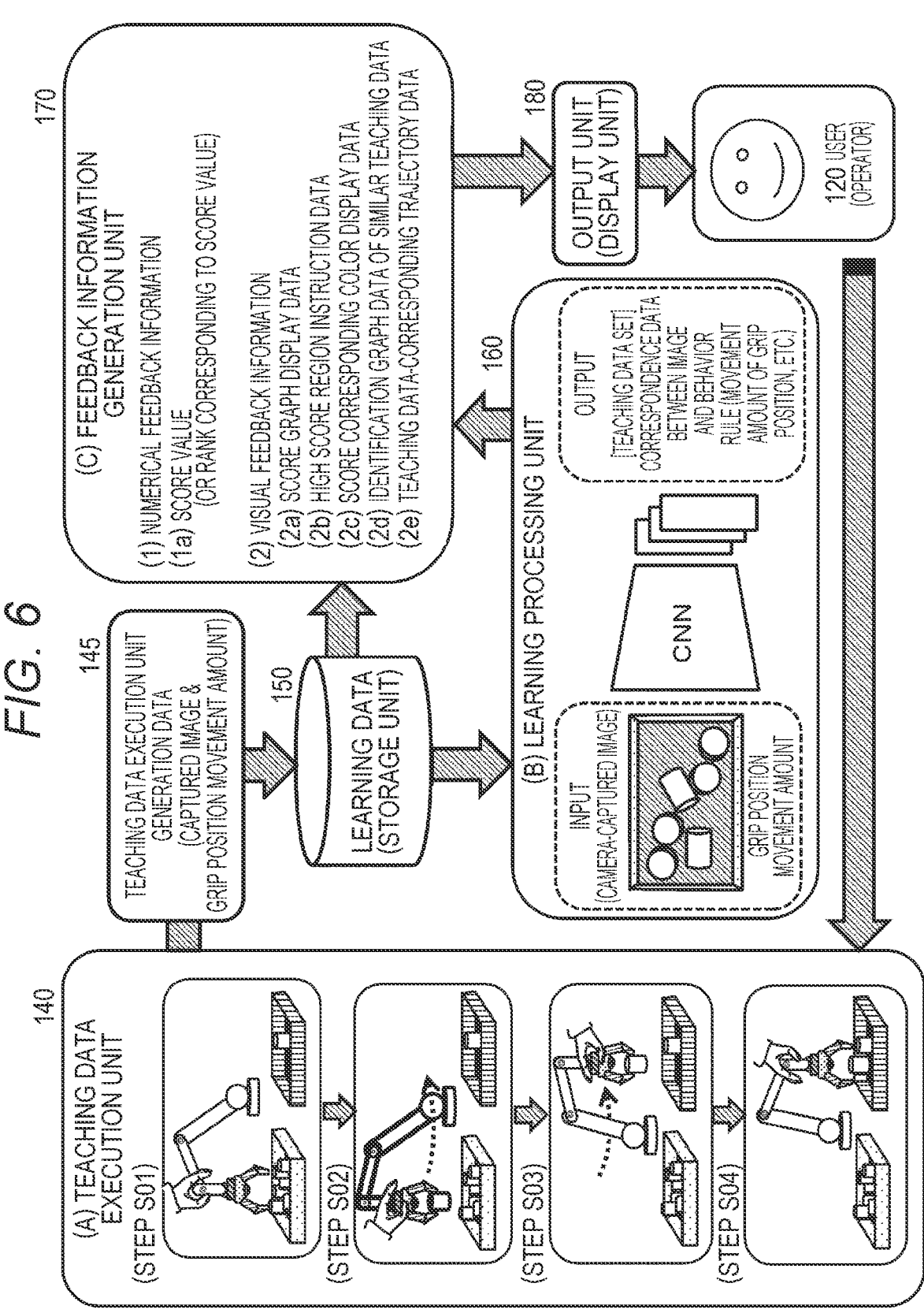
FIG. 6 is a diagram for explaining an outline of processing executed by the information processing device according to the present disclosure.

FIG. 6 illustrates the following respective elements.

(A) Teaching data execution unit 140

(B) Learning processing unit 160

(C) Feedback information generation unit 170

In the "(A) Teaching data execution unit 140", the user (operator) operates the simple teaching tool using the teaching data. In the teaching data execution unit 140, the captured image of the camera attached to the simple teaching tool is analyzed, for example, the position and the movement amount of the grip portion of the simple teaching tool are calculated, and the captured image, the position of the grip portion, and the movement amount data are stored in the storage unit as the learning data 150.

Note that, as described above, the simple teaching tool is a simple tool that enables movement similar to that of an actual robot, and is a small device that can be easily operated by a user.

An actual robot may be used instead of the simple teaching tool.

The "(B) Learning processing unit 160" executes learning processing using the learning data (the captured image, the position of the grip portion, and movement amount data) 150 stored in the storage unit.

(B) The learning result data generated as a result of the learning processing in the learning processing unit 160 includes a teaching data set, that is, a teaching data set including a captured image and a data set of a behavior rule (such as a movement trajectory of a grip position).

The "(C) Feedback information generation unit 170" inputs the learning data 150 generated by (A) the teaching data execution unit 140 and stored in the storage unit, that is, the captured image, the position of the grip portion, and the movement amount data.

Moreover, a teaching data set including learning result data, that is, a captured image and a data set of a behavior rule (a movement trajectory of a grip position or the like) is input from (B) the learning processing unit 160.

The "(C) Feedback information generation unit 170" generates feedback information for the user (operator) on the basis of the input data and outputs the feedback information to the output unit (display unit) 180.

The feedback information displayed on the output unit (display unit) 180 includes the numerical feedback information and the visual feedback information described above.

The user (operator) 120 checks the evaluation of the teaching data executed by the user (operator) 120 by viewing the feedback information displayed on the output unit (display unit) 180. Moreover, a mode of necessary teaching data (such as a trajectory of the grip portion of the robot) is confirmed, and the robot is operated using newly necessary teaching data in (A) the teaching data execution unit 140 according to these confirmation results.

By repeating these processing, it is possible to generate an effective leak-free teaching data set.

Hereinafter, specific configurations and processing of the respective components illustrated in FIG. 6 will be sequentially described.

(4-(A) Configuration and Processing of Teaching Data Execution Unit)

First, the configuration and processing of (A) the teaching data execution unit 140 will be described.

The configuration and processing of the teaching data execution unit 140 will be described with reference to FIG. 7.

Figure 7:
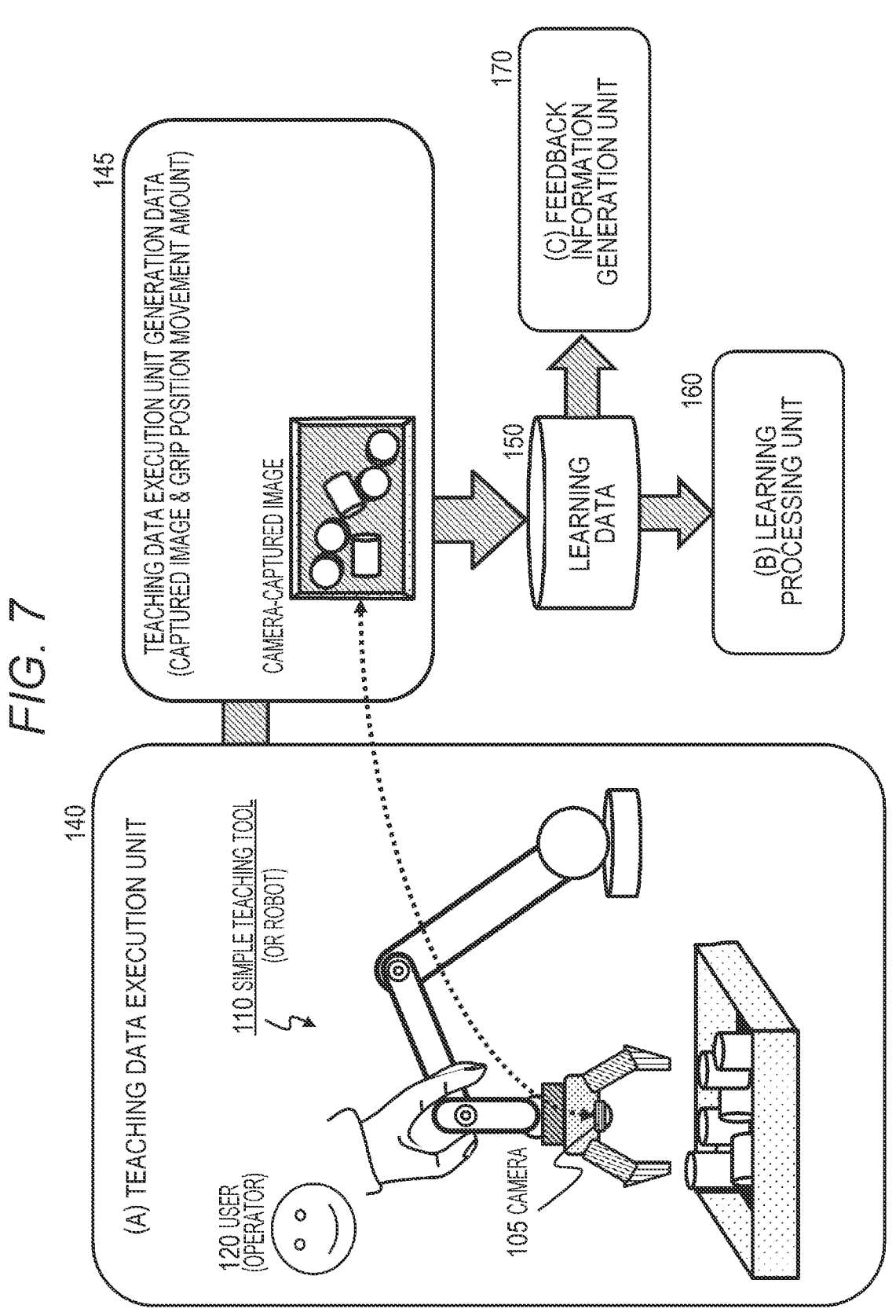
FIG. 7 is a diagram for explaining a configuration and processing of a teaching data execution unit.

As illustrated in FIG. 7, in (A) the teaching data execution unit 140, the user (operator) 120 operates a simple teaching tool 110 using the teaching data. In the teaching data execution unit 140, the captured image of the camera attached to the simple teaching tool is analyzed, for example, the position and the movement amount of the grip portion of the simple teaching tool are calculated, and the captured image, the position of the grip portion, and the movement amount data are stored in the storage unit as the learning data 150.

Note that, as described above, the simple teaching tool is a simple tool that enables movement similar to that of an actual robot, and is a small device that can be easily operated by a user.

An actual robot may be used instead of the simple teaching tool.

As illustrated in FIG. 7, a camera 105 is attached to a grip portion of the simple teaching tool 110.

The user (operator) 120 executes an operation (task) by directly moving the simple teaching tool 110. Alternatively, a controller may be used to move the simple teaching tool 110.

The operation (task) is, for example, a series of operations such as gripping processing and moving processing of a component. It is assumed that execution of one task is one trial.

At the time of execution of this task, the camera 105 continuously executes image capturing. For example, moving image shooting is performed.

In the teaching data execution unit 140, the captured image of the camera 105 is analyzed, and for example, the position and the movement amount of the grip portion of the simple teaching tool are calculated.

The teaching data execution unit 140 generates teaching data execution unit generation data 145 illustrated in FIG. 7, that is, the teaching data execution unit generation data 145 including the captured image, the position of the grip portion, and the movement amount data, and stores the generated data in the storage unit as the learning data 150.

In the teaching data execution unit generation data 145 of FIG. 7, an example of one captured image (camera-captured image) captured at the time of execution of the task is illustrated, but the camera 105 continuously executes image capturing from a start time (t0) of the task to an end time (t_terminal) of the task, and the continuously captured image is stored in the storage unit as the learning data 150.

In the teaching data execution unit 140, the captured image of the camera 105 is analyzed, and for example, the position and the movement amount of the grip portion of the simple teaching tool are calculated. Specifically, for example, time-series data (from the initial time (t0) to the end time (t_terminal) of the task) of the position and the movement amount of the grip position calculated by self-position estimation processing such as simultaneous localization and mapping (SLAM) processing is stored in the storage unit as the learning data 150 together with the camera-captured image.

Note that the simultaneous localization and mapping (SLAM) processing is processing that executes self-position estimation processing (localization) and environmental map generating processing (mapping) in parallel using a camera-captured image.

(4-(B) Configuration and Processing of Learning Processing Unit)

Next, the configuration and processing of (B) the learning processing unit 160 will be described.

Figure 8:
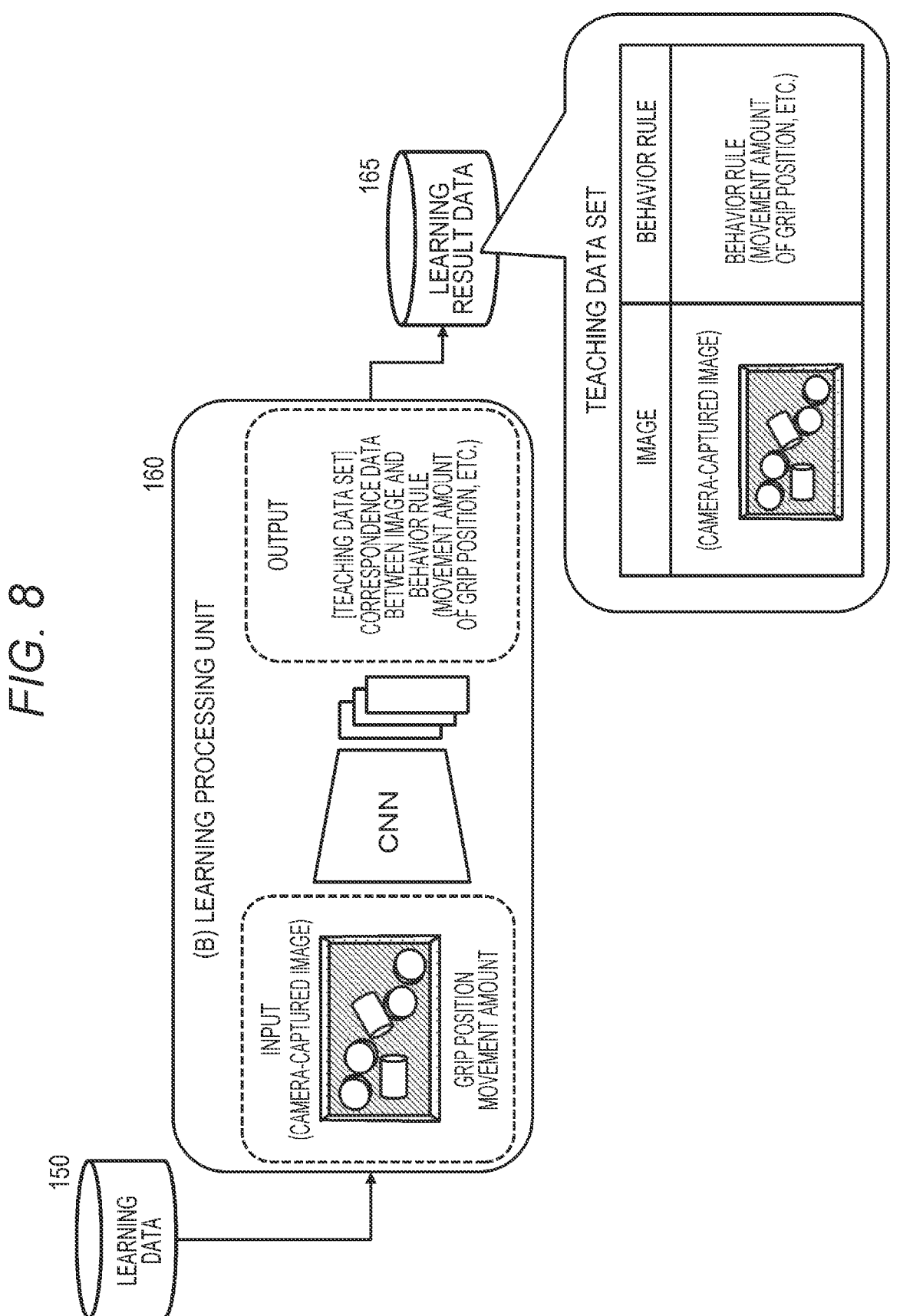
FIG. 8 is a diagram for explaining a configuration and processing of a learning processing unit.

The configuration and processing of the learning processing unit 160 will be described with reference to FIG. 8.

The learning processing unit 160 executes learning processing using the learning data (the captured image, the position of the grip portion, and movement amount data) 150 stored in the storage unit.

The learning processing unit 160 generates, as a learning processing result, learning result data 165 including a teaching data set, that is, a teaching data set including a captured image and a data set of a behavior rule (movement trajectory of a grip position (grip portion) and the like).

The learning processing executed in the learning processing unit 160 is so-called machine learning, and various learning algorithms can be applied. As an example of the learning processing, there is deep learning which is learning processing using a deep neural network (DNN). By using deep learning, sample data is input, and the learning processing unit itself can automatically extract a feature amount from a large amount of data and generate an optimal solution corresponding to various data, for example, a control parameter of a robot.

As learning processing using a deep neural network (DNN), for example, deep learning using a convolutional neural network (CNN) that is a convolutional neural network is known.

The learning processing unit 160 executes learning processing using the learning data (the captured image and the position and movement amount data of the grip portion) 150 stored in the storage unit. The storage unit stores, as learning data 150, an image at a certain time and a position and a movement amount of a grip position at a certain time. The learning processing unit 160 executes learning processing using deep learning (CNN) on these pieces of correspondence data, and learns the positional relationship between the image and the grip portion, that is, the behavior rule.

The learning processing unit 160 generates, as a learning processing result, learning result data 165 including a teaching data set, that is, a teaching data set including a captured image and a data set of a behavior rule (movement trajectory of a grip position (grip portion) and the like).

In the process of creating a teaching data set by the conventional learning processing, the teaching data set as the learning result data is created by repeating the process of executing the teaching data created by the user in the teaching data execution unit 140 and learning the learning data generated as a result thereof in the learning processing unit 160.

However, in such processing, there are many cases where it is not possible to obtain a leak-free learning result since an event such as a case where teaching data arbitrarily created by the user is duplicated or a case where data for a certain region is insufficient occurs.

That is, in such a method, there is no index of how the user should create the teaching data, and it is only required to create and execute the teaching data randomly, and thus there is a problem that it is difficult to obtain an effective learning result.

The (C) feedback information generation unit 170 described below solves this problem.

(4-(C) Configuration and Processing of Feedback Information Generation Unit)

Next, the configuration and processing of the feedback information generation unit 170 will be described.

The configuration and processing of the feedback information generation unit 170 will be described with reference to FIG. 9 and subsequent drawings.

Figure 9:
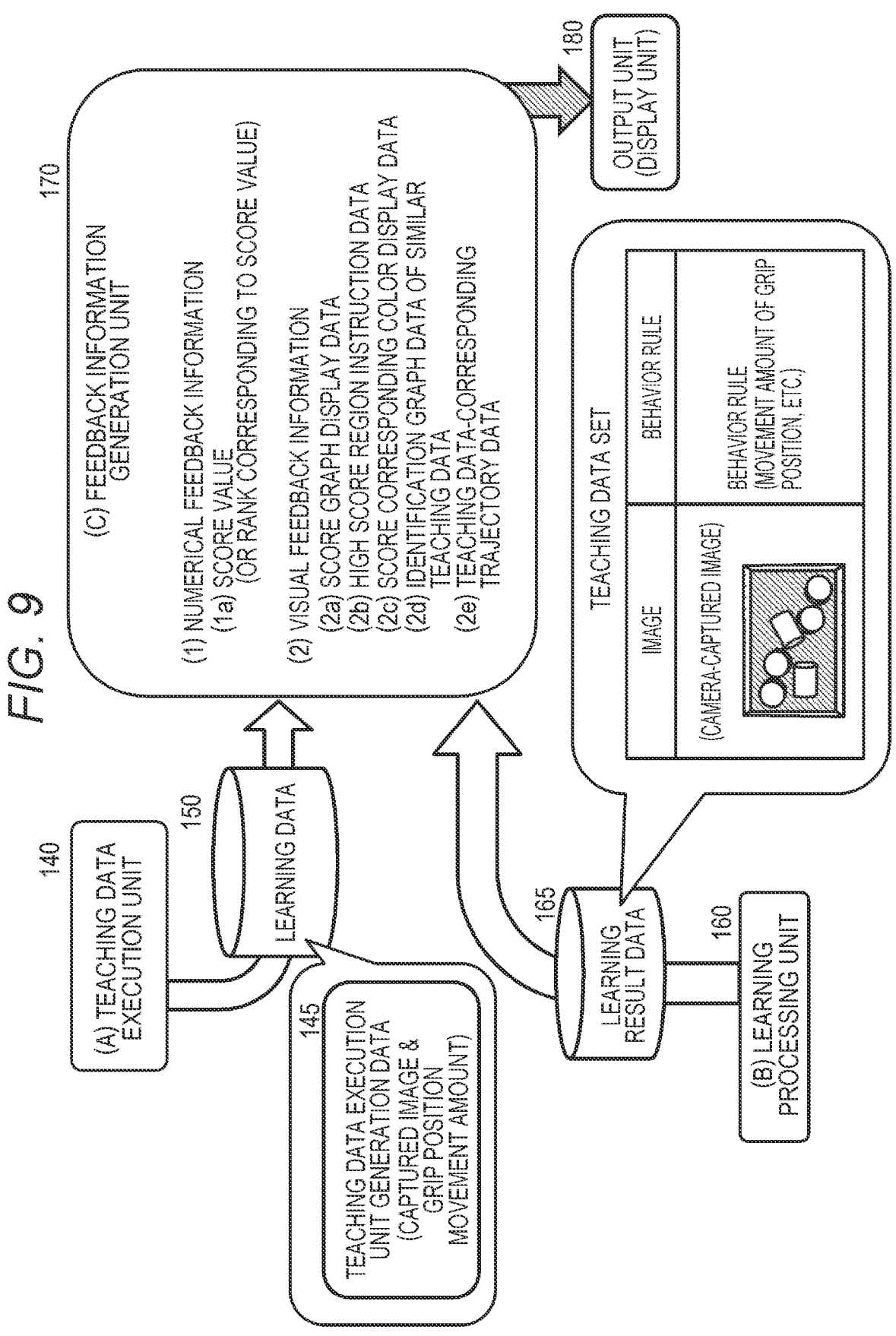
FIG. 9 is a diagram for explaining a configuration and processing of a feedback information generation unit.

As illustrated in FIG. 9, the feedback information generation unit 170 inputs the learning data 150 generated in the teaching data execution unit 140 and stored in the storage unit, that is, the teaching data execution unit generation data 145 including the captured image and the grip portion movement amount data. Moreover, from the learning processing unit 160, the learning result data 165, that is, the teaching data set including the captured image and the data set of the behavior rule (movement trajectory of the grip position and the like) is input.

The feedback information generation unit 170 generates feedback information for the user (operator) on the basis of the input data.

The generated feedback information is output to the output unit (display unit) 180.

The feedback information generated by the feedback information generation unit 170 is the numerical feedback information or the visual feedback information described above.

The user (operator) 120 checks the evaluation of the teaching data executed by the user (operator) 120 by viewing the feedback information displayed on the output unit (display unit) 180. Moreover, a mode of necessary teaching data (such as a trajectory of the grip portion of the robot) is confirmed, and the robot is operated using newly necessary teaching data in the teaching data execution unit 140 according to these confirmation results.

By repeating these processing, it is possible to generate an effective leak-free teaching data set.

Hereinafter, the numerical feedback information and the visual feedback information generated by the feedback information generation unit 170 will be described in detail.

As illustrated in FIG. 9, the numerical feedback information and the visual feedback information generated by the feedback information generation unit 170 are the following pieces of information.

(1) Numerical feedback information

Evaluation value of teaching data executed by user (2) Visual feedback information (2a) Score graph display data (2b) High score region instruction data (2c) Score corresponding color display data (2d) Identification graph data of similar teaching data (2e) Teaching data-corresponding trajectory data Specific examples of these pieces of feedback information will be described with reference to FIG. 10 and subsequent drawings.

First, a specific example of "(1) Numerical feedback information" will be described with reference to FIG. 10.

The numerical feedback information is, for example, an evaluation value of teaching data executed by the user, and a score calculated on the basis of a predefined reference value, for example, a five-grade evaluation value is generated and presented. By using such a score, it is possible to provide the user with easily understandable feedback information.

FIG. 10(1a) illustrates a score calculation example.

As illustrated in FIG. 10(1a), the total score, which is the evaluation value of the teaching data executed by the user, is calculated by an addition value of the following three types of evaluation values (scores) corresponding to the teaching data executed by the user to be evaluated.

(1) Score indicating "uncertainty of behavior rule"

(2) Score indicating "prediction error"

(3) Score indicating "degree of difference between teaching data to be evaluated and executed teaching data"

That is,

> Total score=(Score indicating "uncertainty of behavior rule")+(Score indicating "prediction error")+(score indicating "degree of difference between evaluation target teaching data and executed teaching data")

The total score is calculated according to the above expression.

Note that the total score may be calculated according to the following expression by multiplying the three types of scores by predefined weighting coefficients $\alpha 1$ to $\alpha 3$.

> Total score=$\alpha 1 \times$(Score indicating "uncertainty of behavior rule")+$\alpha 2 \times$(Score indicating "prediction error")+$\alpha 3 \times$(Score indicating "degree of difference between evaluation target teaching data and executed teaching data")

The "uncertainty of behavior rule" is a score indicating the uncertainty of the behavior rule included in the teaching data set that is the learning result data generated as a result of the machine learning processing executed in the learning processing unit 160.

Note that the score indicating the "uncertainty of behavior rule" is calculated by ensemble of a plurality of neural networks and calculating the variance of the outputs.

That is, a plurality of neural networks is prepared, and learning processing is performed using each neural network, thereby estimating prediction uncertainty.

Even if the same data set is used, since there is a difference in the initial weight of the neural network and the portion where the data is sampled, the prediction result of each neural network varies for the portion where the data does not exist, and the prediction uncertainty can be approximately calculated.

Figure 11:
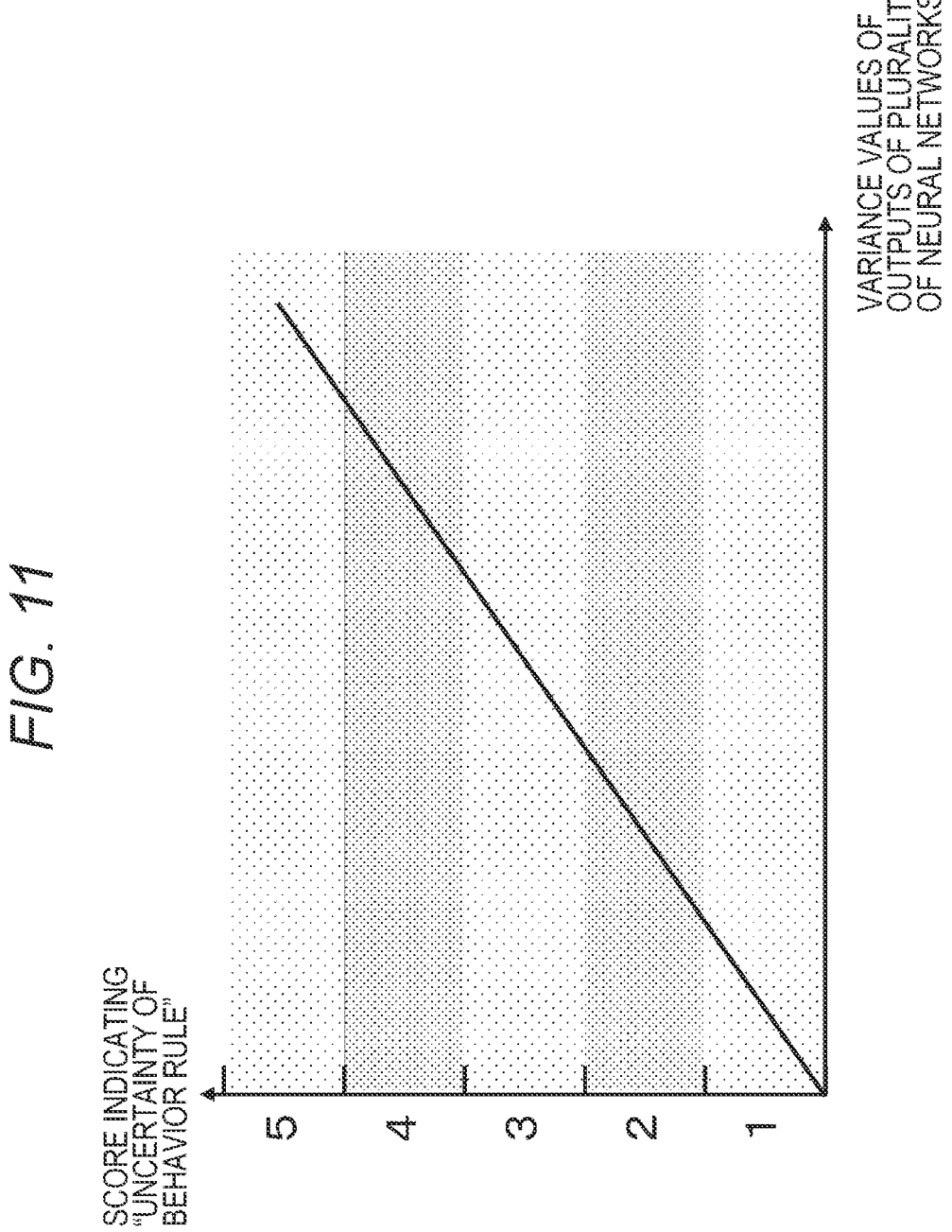
FIG. 11 is a diagram for explaining a specific example of feedback information generated by a feedback information generation unit.

In a case where the score value of the score indicating the "uncertainty of behavior rule" is set to, for example, the range of the score value=0 to 5, for example, the score value is calculated by performing a process of classifying the variance values of the outputs of the plurality of neural networks into the respective score values of the five-grade scores 1, 2, 3, 4, and 5 using the correspondence relationship graph as illustrated in FIG. 11.

The score indicating the "prediction error" is a score corresponding to a difference in the movement positions and the movement amounts of the grip position (grip portion) of the simple teaching tool 110 based on the user operation according to the teaching data in the teaching data execution unit 140 and the movement positions and the movement amounts of the grip position (grip portion) of the simple teaching tool 110 predicted from the behavior rule acquired by the learning processing unit 160 through the learning processing according to the teaching data.

For example, the score is a score calculated using a mean square error between the movement amount of the grip position in the teaching data and the predicted movement amount of the grip position (that is, the value predicted from the behavior rule learned by the neural network).

Figure 12:
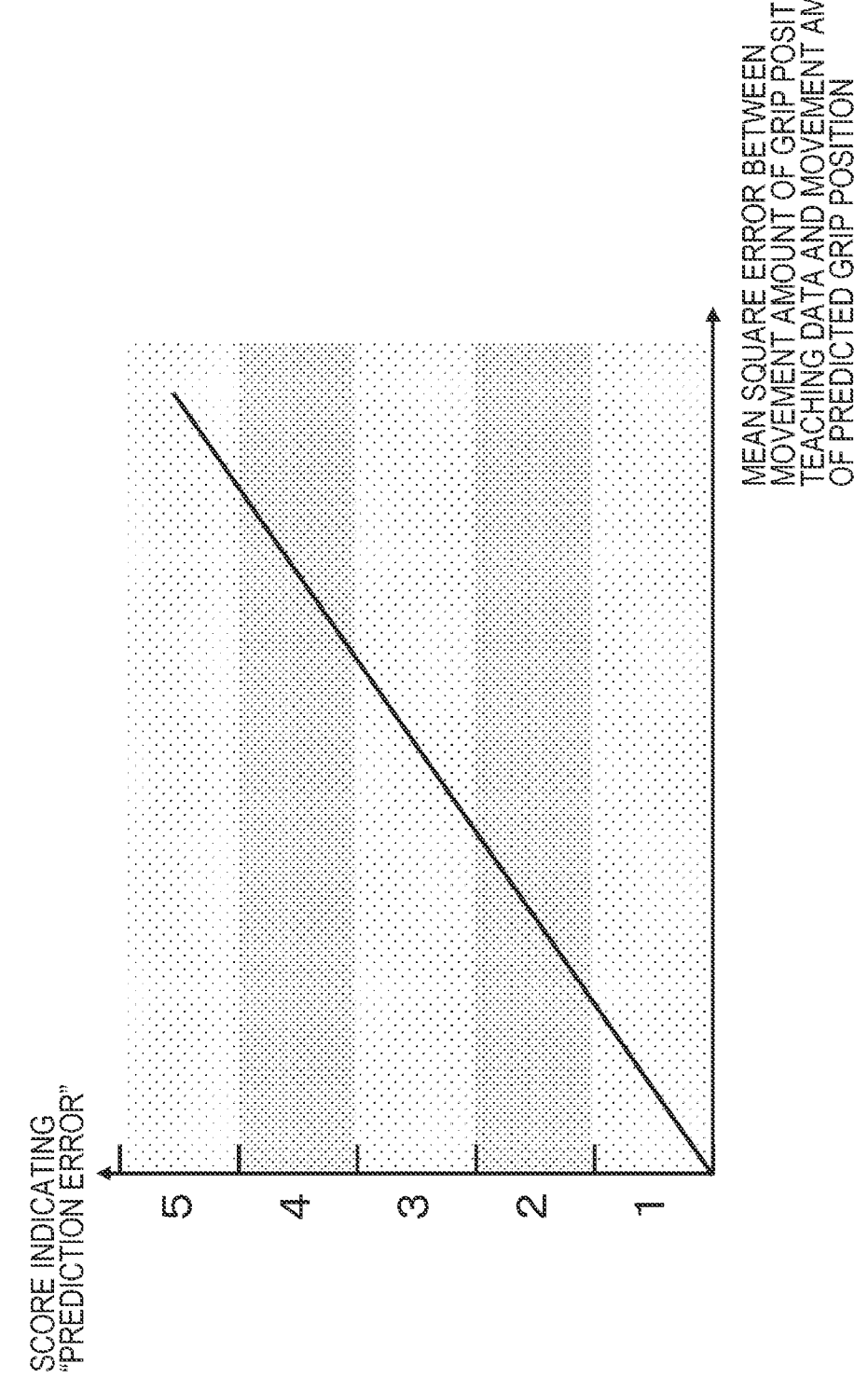
FIG. 12 is a diagram for explaining a specific example of feedback information generated by a feedback information generation unit.

In this case as well, when the score value of the score indicating the "prediction error" is set to, for example, the range of the score value=0 to 5, for example, the score value is calculated by performing a process of classifying the mean square error between the movement amount of the grip position and the movement amount of the predicted grip position of the teaching data into each score value of five-grade scores 1, 2, 3, 4, and 5 using the correspondence relationship graph as illustrated in FIG. 12, for example.

As the score indicating the "degree of difference between the teaching data to be evaluated and the executed teaching data", the degree of difference of the camera-captured image corresponding to each teaching data is used. The degree of difference between the images is calculated using, for example, a variational auto encoder (VAE).

The variational auto encoder (VAE) is a difference degree calculation method in which the expressive power of a latent feature is further improved on the assumption that a latent feature is generated from a probability distribution with respect to a normal auto encoder (AE).

The normal auto encoder (AE) includes, for example, an encoder that compresses high-dimensional information such as image information into a latent feature, and a decoder that restores high-dimensional information from the latent feature.

For example, feature information of an image A having a high-dimensional feature amount is input to the encoder to generate a latent feature including a feature amount with a small number of dimensions.

Moreover, the latent features are input to the decoder to generate a restored image having multi-dimensional features.

The restored image is compared with the original image A, and whether or not the restoration can be correctly performed is learned to evaluate the latent feature.

Note that, in the comparison processing between the restored image and the original image A, for example, the distance of the latent feature corresponding to each of the restored image and the original image A (for example, Euclidean distance=degree of difference) is calculated. As the calculated distance is smaller, it can be determined that the similarity between the restored image and the original image A is higher and the restoration possibility is higher. On the other hand, it can be determined that the similarity between the restored image and the original image A is lower and the restoration possibility is lower as the calculated distance is larger.

The variational auto encoder (VAE) is a difference degree calculation method in which the expressive power of a latent feature is further improved on the assumption that the latent feature is generated from a probability distribution with respect to a normal auto encoder (AE) that performs the above processing.

The score indicating "the degree of difference between the teaching data to be evaluated and the executed teaching data" is a score calculated on the basis of the degree of difference between the calculated two latent features by calculating the latent feature of the camera-captured image corresponding to the teaching data to be evaluated and the latent feature of the camera-captured image corresponding to the executed teaching data by the variational auto encoder (VAE).

Figure 13:
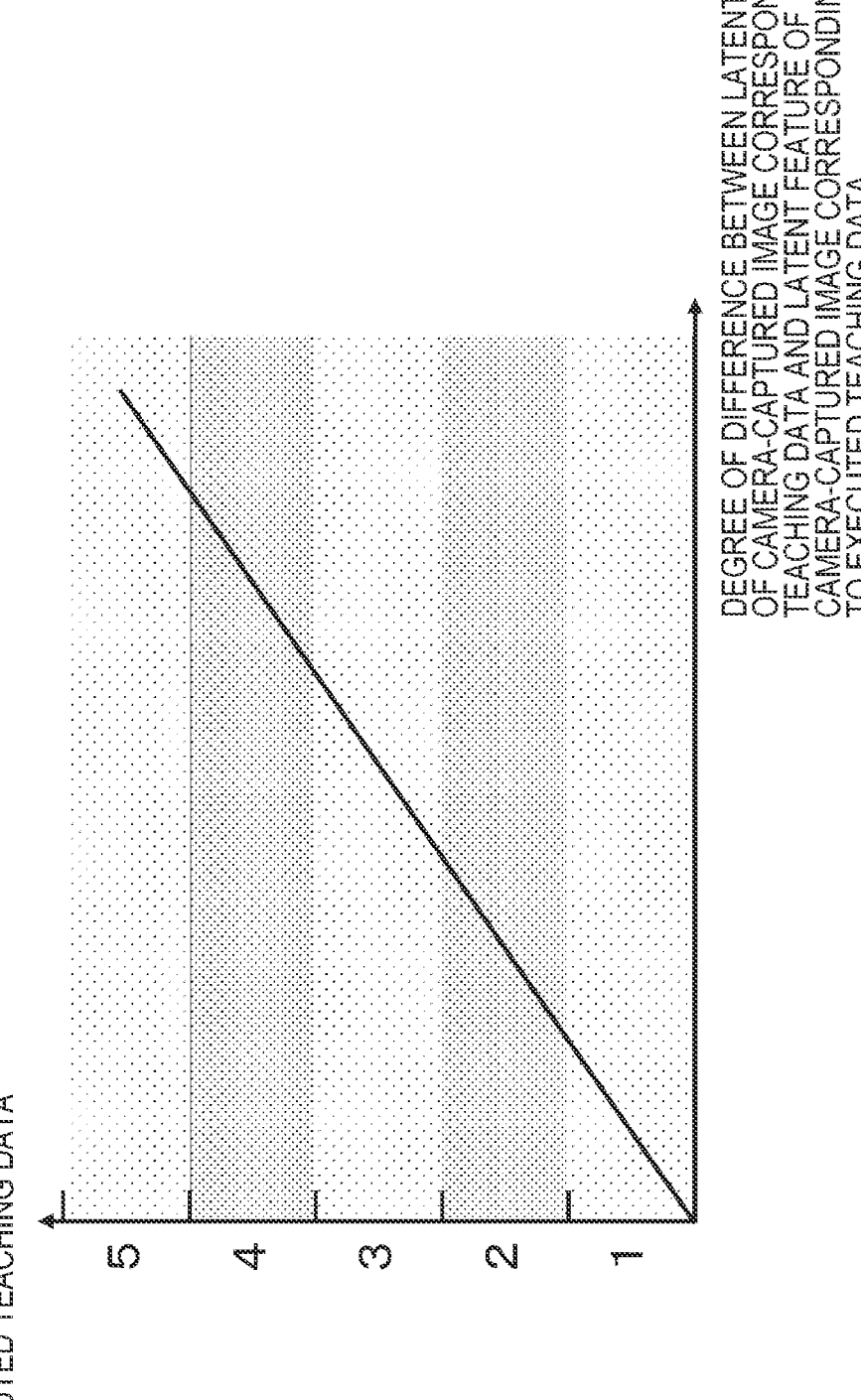
FIG. 13 is a diagram for explaining a specific example of feedback information generated by a feedback information generation unit.

In a case where the score value indicating "the degree of difference between the teaching data to be evaluated and the executed teaching data" is set to a range of, for example, the score value=0 to 5, the score value is calculated by performing a process of classifying the degree of difference between the latent feature of the camera-captured image corresponding to the teaching data and the latent feature of the camera-captured image corresponding to the executed teaching data into each score value of five-grade scores 1, 2, 3, 4, and 5 is performed using the correspondence graph as illustrated in FIG. 13, for example.

In this manner, the numerical feedback information generated by the feedback information generation unit 170, that is, the total score (total evaluation value) of the teaching data executed by the user is expressed as follows.

(1) Score indicating "uncertainty of behavior rule"

(2) Score indicating "prediction error"

(3) Score indicating "degree of difference between teaching data to be evaluated and executed teaching data"

The sum is calculated as an addition value of these three types of scores.

That is, $$\text{Total score} = (\text{Score indicating "uncertainty of behavior rule"}) +$$
$$(\text{Score indicating "prediction error"}) +$$
$$(\text{score indicating "degree of difference between}$$
$$\text{evaluation target teaching data and executed teaching data"})$$

The total score is calculated according to the above expression.

Alternatively, as described above, the total score may be calculated according to the following expression by multiplying the three types of scores by the predefined weighting coefficients $\alpha1$ to $\alpha3$.

$$\text{Total score} = \alpha1 \times (\text{Score indicating "uncertainty of behavior rule"}) +$$
$$\alpha2 \times (\text{Score indicating "prediction error"}) +$$
$$\alpha3 \times (\text{Score indicating "degree of difference between}$$
$$\text{evaluation target teaching data and executed teaching data"})$$

The feedback information generation unit 170 outputs the total score calculated in this manner to the output unit (display unit) 180 to present to the user 120.

Moreover, the feedback information generation unit 170 ranks the calculated total score as illustrated in FIG. 10(1b), generates rank information corresponding to the score of the teaching data to be evaluated, outputs the rank information to the output unit (display unit) 180, and presents the rank information to the user 120.

The ranks are, for example, three ranks of S, A, and B as illustrated in FIG. 10(1b).

Rank S has a total score=15 to 13

Rank A has a total score of 12 to 10.

Rank B has a total score of 9 to 7

: :

For example, ranking corresponding to these score values is executed.

Note that this score correspondence rank setting is an example, and in addition to this, various score correspondence ranks can be performed.

As described above, the feedback information generation unit 170 calculates the score as the evaluation value of the teaching data executed by the user and the rank corresponding to the score, and outputs the score and the rank to the output unit (display unit) 180.

FIG. 10 illustrates the following two types of output data examples as output data examples of the feedback information generated by the feedback information generation unit 170 to the output unit (display unit) 180.

Output Data Example 1

$$\text{Feedback score} = (\text{Teaching data score})/(\text{Baseline score})$$

Output Data Example 2

$$\text{Feedback score} = (\text{teaching data score})/$$
$$((\text{Prediction maximum score}) - (\text{Prediction minimum score}))$$

(Output data example 1) is an example of output data in which a score (teaching data score) as an evaluation value of the teaching data executed by the user and a score (baseline score) corresponding to a reference value (baseline) are displayed side by side while separated by a slash (/).

Further, as the score corresponding to the reference value (baseline) (baseline score), for example, a score prepared in advance for evaluation is used.

For example, an average value of scores corresponding to the teaching data calculated so far, a value of the highest score, and the like can be applied.

Alternatively, a score (baseline score) calculated in advance on the basis of a plurality of pieces of sample teaching data prepared in advance for evaluation may be used.

An example of calculation processing of (baseline score) based on a plurality of pieces of sample teaching data prepared in advance for evaluation will be described.

For example, for each of a plurality of pieces of sample teaching data prepared in advance for evaluation, the following values are calculated, (1) "Uncertainty of behavior rule"

(2) "Prediction error"

(3) "Degree of difference between teaching data to be evaluated and executed teaching data".

(Baseline score) based on the plurality of sample teaching data is calculated on the basis of the average value of these calculated values.

The example illustrated in (Output data example 1) of FIG. 10 is an example in which the highest score is used as (baseline score) that is a score corresponding to the reference value (baseline).

For example, in a case where the highest score of the total score is 15 and the total score of the teaching data executed by the user is 9, the display data includes:

$$\text{Total score} = 9/15$$

Such display data is obtained.

Note that the score to be output may be set, for example, to calculate and output an average value of each trial of the teaching data executed by the user 120. For example, an average value from the series data $t0$ to $t\_terminal$ of each trial may be calculated and output.

Moreover, the above-described ranks may be displayed together to form the following display data.

$$\text{Rank(total score)} = B(9/15)$$

An example of the display data corresponds to the display data of the output unit (display unit) 180 on the right side of FIG. 10.

Moreover, as illustrated in the example of the display data of the output unit (display unit) 180 on the right side of FIG. 10, in addition to the total score, individual scores applied to the calculation of the total score include, that is, (1) Score indicating "uncertainty of behavior rule"

(2) Score indicating "prediction error"

(3) Score indicating "degree of difference between teaching data to be evaluated and executed teaching data"

These individual scores is as follows, similar to the total score, $$\text{Individual score} = \text{(teaching data score)}/\text{(score of baseline)}$$

Data in such a display form may be generated and displayed.

Another output data example illustrated in FIG. 10 is

Output Data Example 2

$$\text{Feedback score} = \text{(teaching data score)}/$$
$$\text{((Prediction maximum score)} - \text{(Prediction minimum score))}$$

This is output data example 2.

This (output data example 2) is an example of output data in which a score (teaching data score) as an evaluation value of the teaching data executed by the user and a difference ((prediction maximum score)–(prediction minimum score)) between a maximum score and a minimum score calculated according to a predefined score prediction algorithm are displayed side by side while separated by a slash (/).

Note that these output data examples are examples, and the display mode of the output data with respect to the output unit (display unit) 180 of the feedback information generated by the feedback information generation unit 170 can be set to various other modes.

Next, a specific example of the visual feedback information generated by the feedback information generation unit 170 will be described.

As described above, the visual feedback information generated by the feedback information generation unit 170 includes, for example, the following information.

(2a) Score graph display data (2b) High score region instruction data (2c) Score corresponding color display data (2d) Identification graph data of similar teaching data (2e) Teaching data-corresponding trajectory data Specific examples of these pieces of visual feedback information will be described with reference to FIG. 14 and subsequent drawings.

(2a) Score Graph Display Data

First, a specific example of "(2a) score graph display data" will be described.

As described above, the score graph display data is, for example, graphic data such as a bar graph corresponding to the score, and is data in which the evaluation value of the teaching data executed by the user is set as easy-to-understand visual information. For example, a bar graph or the number of stars (★★☆☆☆ or the like) corresponding to the score that is the numerical feedback information is output.

Figure 14:
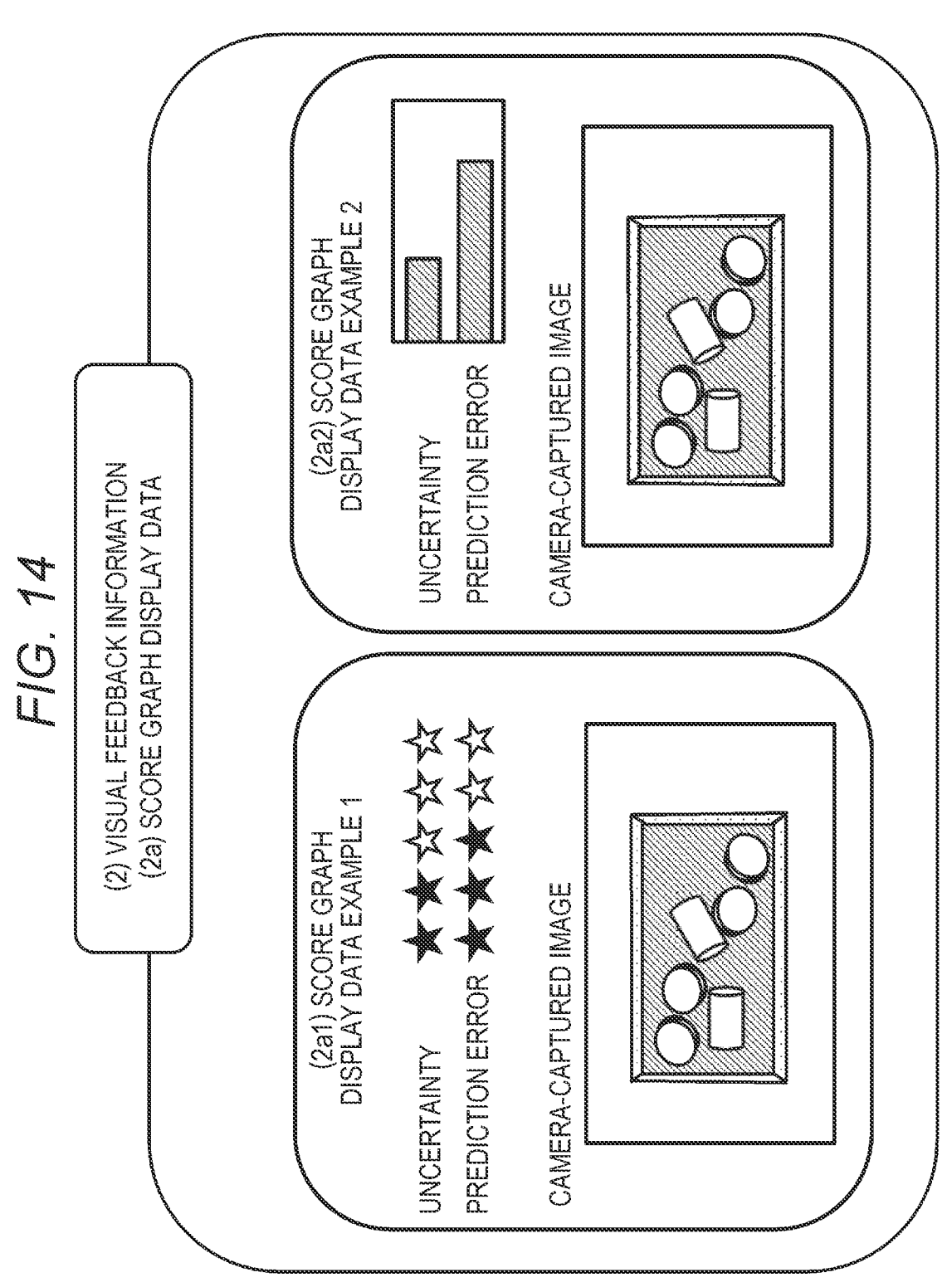
FIG. 14 is a diagram for explaining a specific example of feedback information generated by a feedback information generation unit.

FIG. 14 is a diagram for explaining a specific example of "(2a) Score graph display data".

Together with the captured image of the simple teaching tool 110 or the camera attached to the robot 100, a bar graph or the number of stars (★★☆☆☆ or the like) corresponding to the score that is the numerical feedback information described above is output.

The example illustrated in FIG. 14 shows an example.

(1) Score indicating "uncertainty of behavior rule"

(2) Score indicating "prediction error"

In the example, a bar graph or the number of stars (★★☆☆☆ or the like) corresponding to these two types of scores is output.

The display data is an example.

(1) Score indicating "uncertainty of behavior rule"

(2) Score indicating "prediction error"

(3) Score indicating "degree of difference between teaching data to be evaluated and executed teaching data"

Graph data in which all of these three types of scores are bar graphs or the number of stars (★★☆☆☆ or the like) may be generated and displayed.

Moreover, a bar graph generated on the basis of the total score calculated on the basis of these individual scores or the number of stars (★★☆☆☆ or the like) may be displayed.

In addition, for example, by displaying the score graph display data as illustrated in FIG. 14 on the output unit (display unit) 180, the user can immediately confirm whether or not the score of the teaching data executed by the user is high or low.

(2b) High Score Region Instruction Data

Next, a specific example of "(2b) high score region instruction data" will be described.

As described above, the high score region instruction data is, for example, data in which a mark such as an arrow indicating a region in which teaching data with a high score can be generated is displayed on a camera-captured image.

When the captured image of the simple teaching tool 110 or the camera attached to the robot 100 is output to the display unit, a mark such as an arrow indicating a region where teaching data with a high score can be generated is displayed on the display image.

Figure 15:
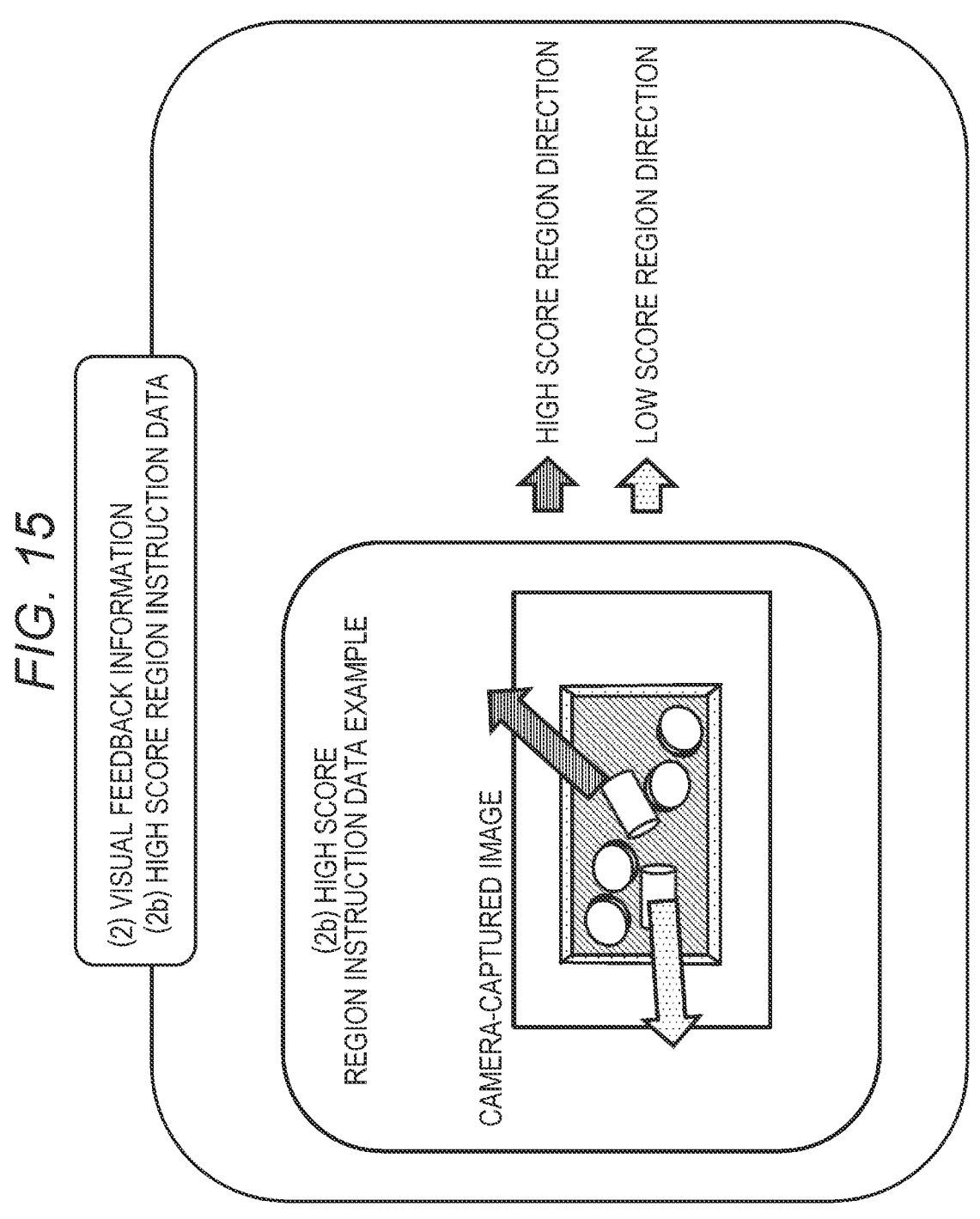
FIG. 15 is a diagram for explaining a specific example of feedback information generated by a feedback information generation unit.

FIG. 15 is a diagram for explaining a specific example of "(2b) High score region instruction data".

As illustrated in FIG. 15, a mark such as an arrow indicating a region where teaching data having a high score can be generated is displayed on a captured image of the simple teaching tool 110 or a camera attached to the robot 100.

In the example illustrated in FIG. 15, an arrow indicating a region where teaching data with a high score can be generated and an arrow indicating a region where teaching data with a low score is generated are displayed in different colors.

For example, an arrow indicating the high score region direction is displayed as a red arrow, and an arrow indicating the low score region direction is displayed as a blue arrow.

If teaching data is generated for a region in a direction of a red arrow which is an arrow indicating a high score region direction, teaching data having a high score can be generated.

By presenting such display data to the user, the user can confirm the position, trajectory, and the like of the teaching data to be newly generated.

(2c) Score Corresponding Color Display Data

Next, a specific example of "(2c) Score corresponding color display data" will be described.

As described above, the score corresponding color display data is display data of the camera-captured image that outputs the score correspondence color.

When the captured image of the simple teaching tool 110 or the camera attached to the robot 100 is output to the display unit, the color of the display image is set to a different color according to the score which is the numerical feedback information described above. For example, a blue image is set in a case where the score is low, and a red image is set in a case where the score is high.

Figure 16:
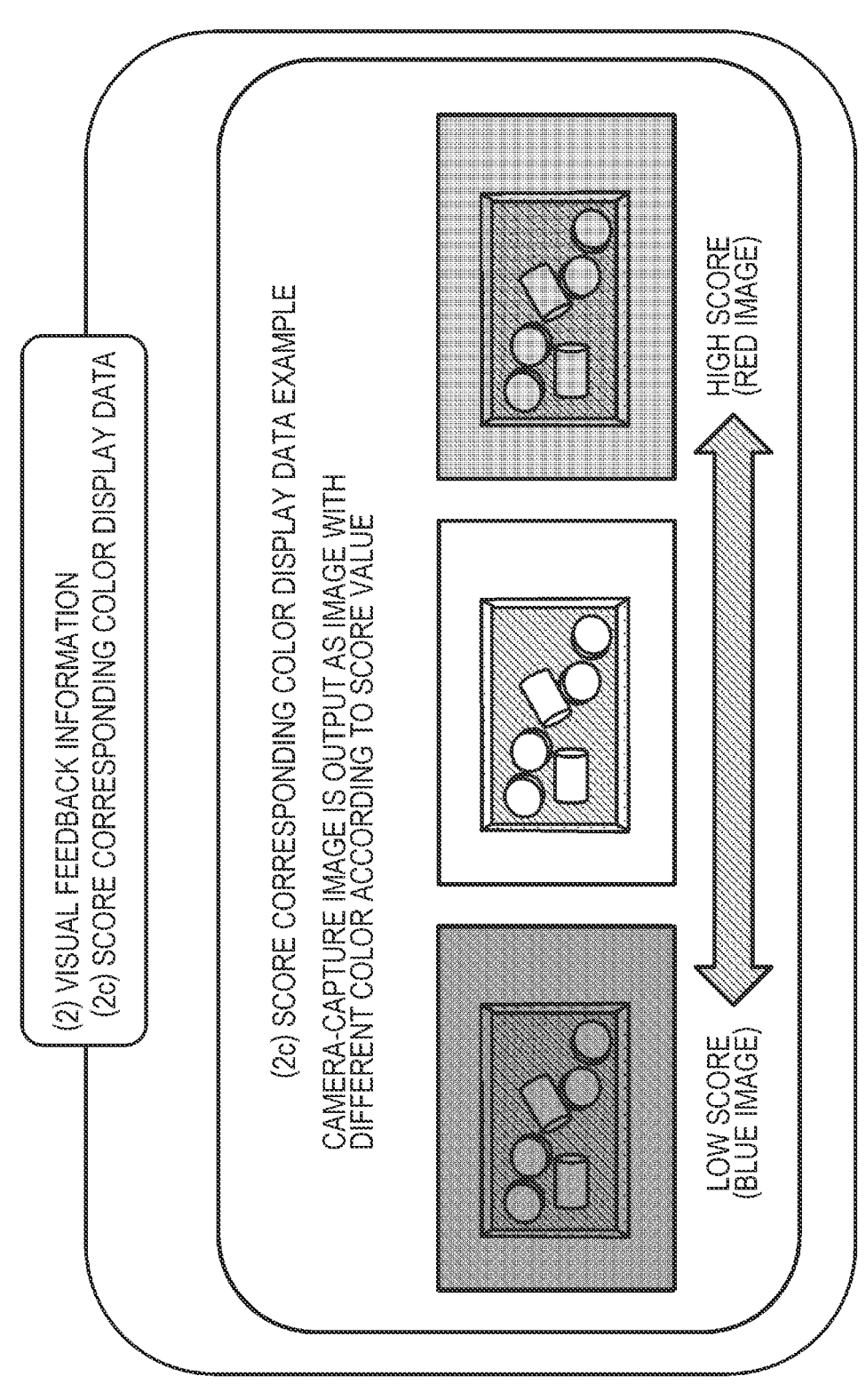
FIG. 16 is a diagram for explaining a specific example of feedback information generated by a feedback information generation unit.

FIG. 16 is a diagram for explaining a specific example of "(2c) Score corresponding color display data".

As illustrated in FIG. 16, when the captured image of the simple teaching tool 110 or the camera attached to the robot 100 is output to the display unit, the color of the display image is set to a different color according to the score which is the numerical feedback information described above.

In the example illustrated in FIG. 16, an image in a case where the score is low is a blue image. Furthermore, an image in a case where the score is high is a red image.

Therefore, the user can immediately confirm whether or not the score of the teaching data executed by the user is high or low.

(2d) Identification Graph Data of Similar Teaching Data

Next, a specific example of "(2d) Identification graph data of similar teaching data" will be described.

As described above, the identification graph data of the similar teaching data is comparison data of the feature data obtained from the camera-captured image according to the trajectory of the simple teaching tool 110 or the robot 100 according to the teaching data newly executed by the user and the feature data acquired from the camera-captured image corresponding to the already executed teaching data.

Comparison data between teaching data newly executed by the user and teaching data already executed is generated and displayed.

For example, comparison data of the feature data obtained from the camera-captured image according to the trajectory of the robot according to the teaching data newly executed by the user and the feature data acquired from the camera-captured image corresponding to the already executed teaching data is generated and displayed.

Note that the display data is compressed and displayed as latent feature data of several dimensions for easy understanding.

FIG. 17 is a diagram for explaining a specific example of "(2d) Identification graph data of similar teaching data".

The display data illustrated in FIG. 17 is graph data in which points of past teaching data and current teaching data are displayed on a two-dimensional graph of the X1 axis and the X2 axis.

The X1 axis and the X2 axis correspond to elements of two-dimensional latent feature data generated by compressing feature data acquired from a camera-captured image.

As described above, the latent feature data is feature data obtained by compressing and simplifying the feature data included in the original data. For example, the feature data obtained from the captured image of the camera includes a large number of pieces of data such as the size (height, width) of the image, the object distance, the color in units of pixels, and the luminance, and when all of them are to be output, the feature data becomes enormous data of several 100 dimensions, and analysis processing requires enormous time.

The two-dimensional graph illustrated in FIG. 17 is data in which the enormous data is compressed into, for example, two-dimensional data, and each two-dimensional element is illustrated as a two-dimensional graph with an X1 axis and an X2 axis.

That is, the feedback information generation unit 170 generates identification graph data indicating similarity or a degree of difference between latent feature data generated by compressing feature data acquired from a camera-captured image corresponding to movement of the robot based on the teaching data applied to the user operation executed in the teaching data execution unit 140 and latent feature data generated by compressing feature data acquired from a camera-captured image corresponding to movement of the robot based on teaching data executed in the past, and outputs the identification graph data to the output unit.

Note that, for drawing the feature amount, for example, a t-SNE method (data analysis method for mapping a high-dimensional vector to a low dimension) can be used. By applying the t-SNE method, it is possible to convert the feature information data into the low-dimensional feature information data while maintaining the relationship of the high-dimensional feature information, and the user can visually understand the difference between the teaching data.

In the two-dimensional graph shown in FIG. 17, points corresponding to a plurality of past teaching data are set at the upper left, and points corresponding to the current teaching data are displayed at the lower right.

The shorter the distance on the two-dimensional graph, the more similar the camera-captured images corresponding to the teaching data are.

In the example illustrated in the drawing, the points corresponding to the plurality of past teaching data illustrated in the upper left are densely arranged, which means that images corresponding to similar teaching data are acquired.

The point of the current teaching data at the lower right shown in the drawing is away from the points corresponding to the plurality of past teaching data shown at the upper left, which means that the image corresponding to the current teaching data has a feature different from the image corresponding to the past teaching data.

That is, it can be confirmed that the current teaching data is highly likely to be useful teaching data different from the past teaching data.

Thus, the user can easily confirm whether or not the newly executed teaching data is similar to the executed teaching data by referring to "(2d) Identification graph data of similar teaching data".

(2e) Teaching Data-Corresponding Trajectory Data

Next, a specific example of "(2e) Teaching data-corresponding trajectory data" will be described.

As described above, the teaching data-corresponding trajectory data displays comparison data generated between the trajectory (for example, the grip position) of the simple teaching tool 110 or the robot 100 based on the teaching data newly executed by the user and the trajectory (for example, the grip position) of the robot based on the teaching data already executed.

The comparison data between a trajectory (for example, a grip position) of the robot based on the teaching data newly executed by the user and a trajectory (for example, a grip position) of the simple teaching tool 110 or the robot 100 based on the teaching data already executed is generated and displayed.

For example, trajectory data is drawn and displayed on a three-dimensional graph.

FIG. 18 is a diagram for explaining a specific example of "(2e) Teaching data-corresponding trajectory data".

The display data illustrated in FIG. 18 is graph data in which trajectories of past teaching data and current teaching data are displayed on a three-dimensional graph indicating an xyz three-dimensional space.

The dotted line is a trajectory corresponding to the past teaching data, and the solid line is a trajectory of the current teaching data.

Note that the trajectory is, for example, a movement trajectory of the simple teaching tool 110 or the grip portion of the robot 100.

The user can easily confirm whether or not the trajectory based on the newly executed teaching data is similar to the trajectory of the executed teaching data by confirming "(2e) Teaching data-corresponding trajectory data" in which such trajectory data corresponding to a plurality of pieces of teaching data is displayed side by side.

As described above, the feedback information generation unit 170 generates various feedback information and outputs the feedback information to the output unit (display unit) 180. That is, the following pieces of information are generated and output to the output unit (display unit) 180.

(1) Numerical feedback information

Evaluation value of teaching data executed by user (2) Visual feedback information (2a) Score graph display data (2b) High score region instruction data (2c) Score corresponding color display data (2d) Identification graph data of similar teaching data (2e) Teaching data-corresponding trajectory data The user (operator) 120 checks the evaluation of the teaching data executed by the user (operator) 120 by viewing the feedback information displayed on the output unit (display unit) 180. Moreover, a mode of necessary teaching data (such as a trajectory of the grip portion of the robot) is confirmed, and the simple teaching tool 110 and the robot 100 are operated using newly necessary teaching data in the teaching data execution unit 140 according to these confirmation results.

By repeating these processing, it is possible to generate an effective leak-free teaching data set.

5. Example of Display Data in Output Unit

Next, an example of display data in the output unit will be described.

As described above, the feedback information generation unit 170 generates various feedback information and outputs the feedback information to the output unit (display unit) 180.

The output unit (display unit) 180 can be configured in an information processing device including the learning processing unit 160 and the feedback information generation unit 170 described with reference to FIG. 6, but for example, a terminal such as a smartphone owned by the user 120 away from these configuration units may be used.

Figure 19:
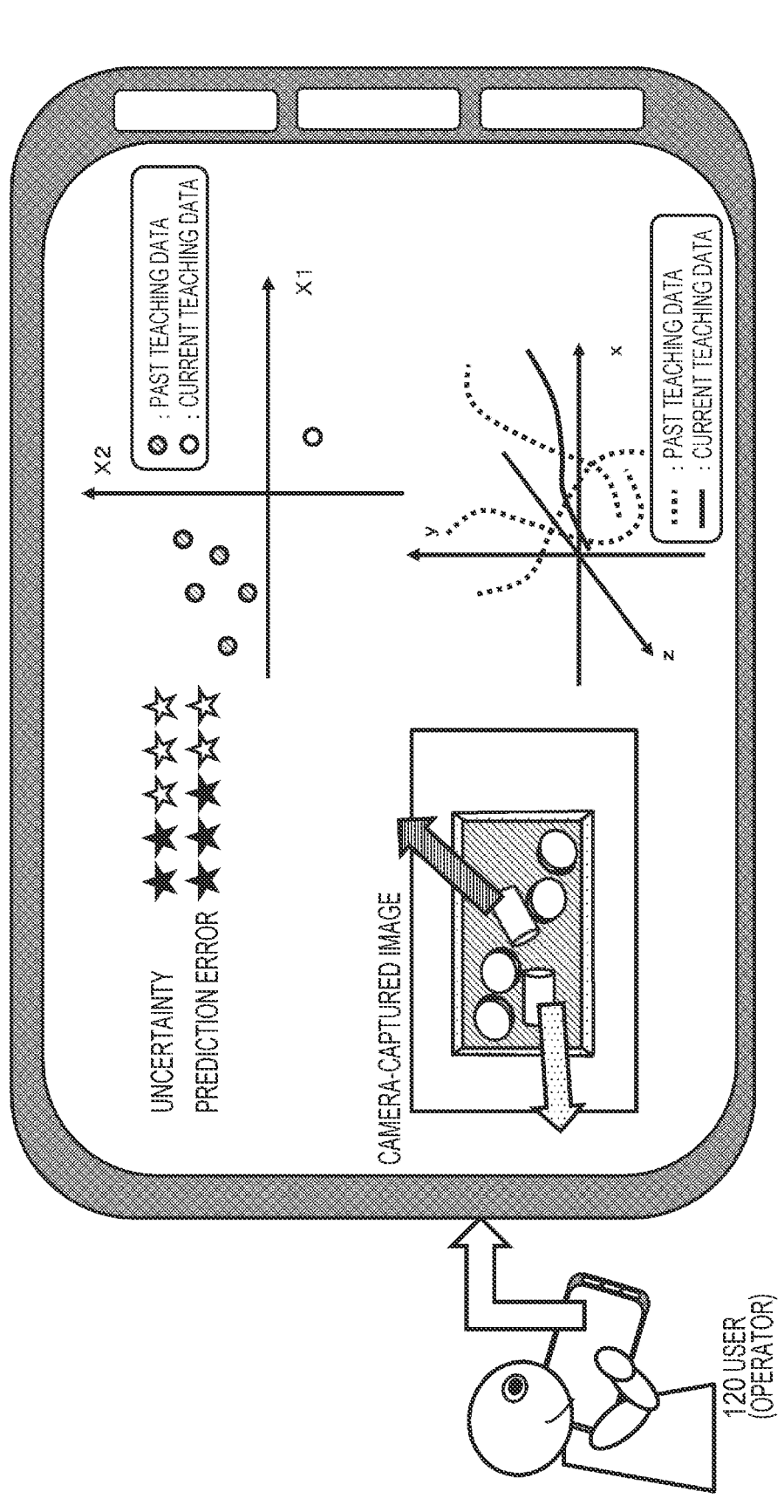
FIG. 19 is a diagram for explaining a specific example of feedback information generated by a feedback information generation unit and output to an output unit.

FIG. 19 illustrates an example in which the feedback information generated by the feedback information generation unit 170 is output and displayed on a terminal such as a smartphone owned by the user 120.

The display data illustrated in FIG. 19 is the visual feedback information described above with reference to FIGS. 14 to 18, that is, (2a) Score graph display data (2b) High score region instruction data (2c) Score corresponding color display data (2d) Identification graph data of similar teaching data (2e) Teaching data-corresponding trajectory data This is an example of data in which a plurality of pieces of visual feedback information is displayed together.

The user 120 can confirm the evaluation of the teaching data executed by the user 120 by viewing the displayed feedback information, confirm the mode of the new teaching data (such as the trajectory of the grip portion of the robot) to be necessary, and cause the teaching data execution unit 140 to execute the new teaching data according to these confirmation results. By repeating this process, it is possible to efficiently generate an effective leak-free teaching data set.

6. Configuration Example of Information Processing Device According to Present Disclosure Next, a configuration example of the information processing device according to the present disclosure will be described.

Figure 20:
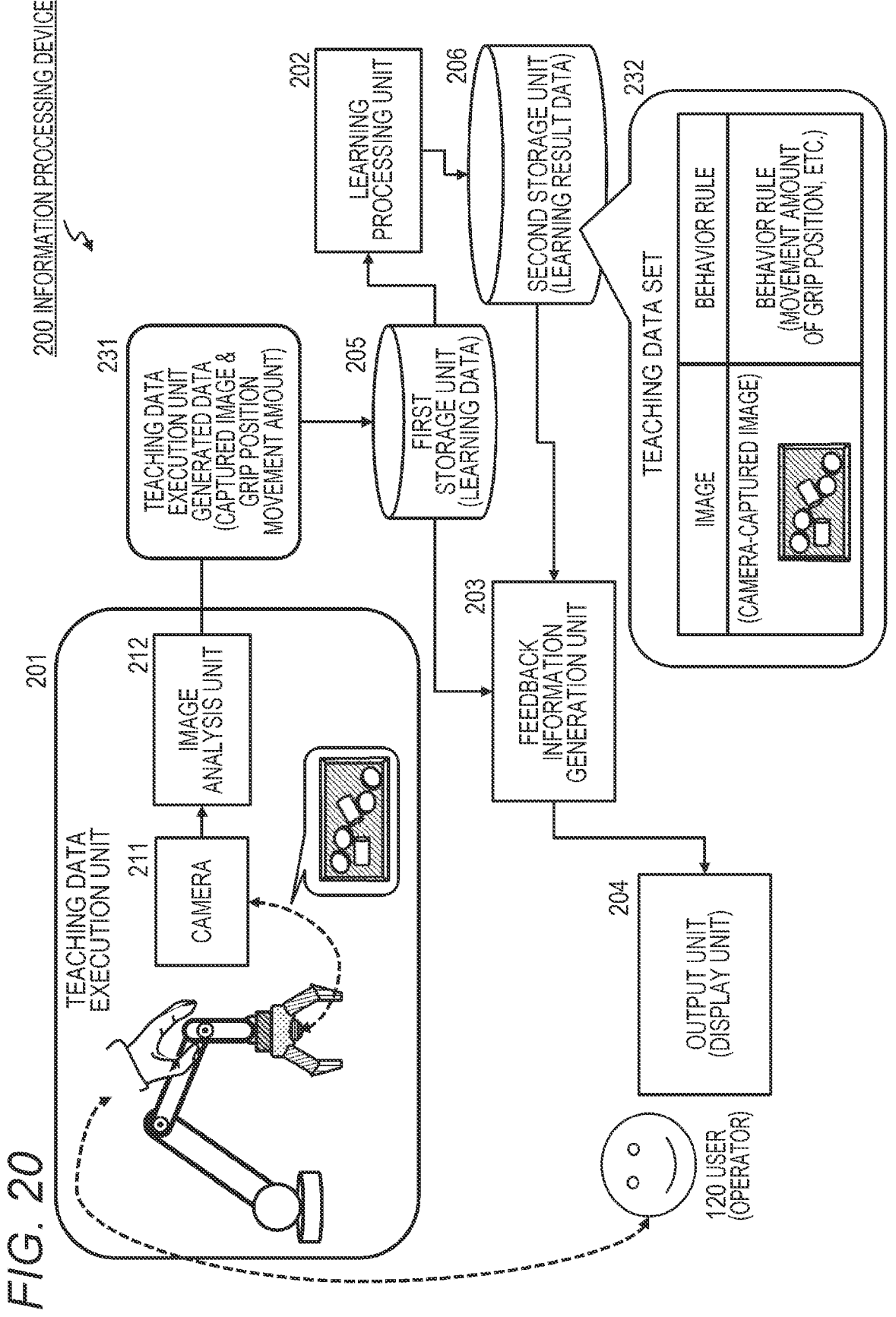
FIG. 20 is a diagram for explaining a configuration example of the information processing device according to the present disclosure.

FIG. 20 is a block diagram for explaining a configuration example of an information processing device 200 of the present disclosure.

As illustrated in FIG. 20, the information processing device 200 of the present disclosure includes a teaching data execution unit 201, a learning processing unit 202, a feedback information generation unit 203, an output unit (display unit) 204, a first storage unit 205, and a second storage unit 206.

The teaching data execution unit 201 includes a camera 211 attached to a simple teaching tool or a robot, and an image analysis unit 212.

In the teaching data execution unit 201, the user (operator) operates the simple teaching tool or the robot using the teaching data. The camera 211 is attached to the simple teaching tool or the robot.

The camera 211 captures continuous images in the operation state of the simple teaching tool or the robot by the user. The camera 211 captures, for example, an image of the simple teaching tool or the grip portion of the robot in the arm tip direction.

The captured image of the camera 211 is inputted to the image analysis unit 212.

The image analysis unit 212 analyzes the captured image of the camera 211. The image analysis unit 212 calculates, for example, the position and the movement amount of the simple teaching tool or the grip portion of the robot by analyzing the captured image of the camera 211, and stores the captured image, the position of the grip portion, and the movement amount data in the first storage unit as learning data.

The user performs an action (task) by directly moving the simple teaching tool or the robot. Alternatively, the simple teaching tool or the robot may be moved using a controller.

The operation (task) is, for example, a series of operations such as gripping processing and moving processing of a component. It is assumed that execution of one task is one trial.

At the time of execution of this task, the camera 211 continuously executes image capturing. For example, moving image shooting is performed.

The image analysis unit 212 of the teaching data execution unit 201 analyzes the captured image of the camera 211, and calculates, for example, the position and movement amount of the simple teaching tool or the grip portion of the robot. Specifically, for example, time-series data (from the initial time (t0) to the end time (t_terminal) of the task) of the position and the movement amount of the grip position calculated by self-position estimation processing such as simultaneous localization and mapping (SLAM) processing is stored in the first storage unit 205 as learning data.

Note that the simultaneous localization and mapping (SLAM) processing is processing that executes self-position estimation processing (localization) and environmental map generating processing (mapping) in parallel using the camera-captured image.

The learning processing unit 202 executes learning processing using the learning data (the captured image and the grip portion movement amount data) stored in the first storage unit 205.

The learning result data generated as a result of the learning processing in the learning processing unit 202 is a teaching data set, that is, a teaching data set including a captured image and a data set of a behavior rule (such as a movement trajectory of a grip position), and this data is stored in the second storage unit 206.

The learning processing executed in the learning processing unit 202 is machine learning as described above, and various learning algorithms can be applied. As an example of the learning processing, there is deep learning which is learning processing using a deep neural network (DNN). By using deep learning, sample data is input, and the learning processing unit itself can automatically extract a feature amount from a large amount of data and generate an optimal solution corresponding to various data, for example, a control parameter of a robot.

As learning processing using a deep neural network (DNN), for example, deep learning using a convolutional neural network (CNN) that is a convolutional neural network is known.

The learning processing unit 202 executes learning processing using the learning data (the captured image and the position and movement amount data of the grip portion) stored in the first storage unit 205. The first storage unit 205 stores, as learning data, an image at a certain time and a position and a movement amount of a grip position at a certain time. The learning processing unit 202 executes learning processing using deep learning (CNN) on these pieces of correspondence data, and learns the positional relationship between the image and the grip portion, that is, the behavior rule.

The learning processing unit 202 generates learning result data including a teaching data set, that is, a teaching data set including a captured image and a data set of a behavior rule (such as a movement trajectory of a grip position) as a learning processing result, and stores the learning result data in the second storage unit 206.

As illustrated in FIG. 20, the second storage unit 206 stores a teaching data set 232 including a captured image and a data set of a behavior rule (a movement trajectory of the grip position and the like).

The feedback information generation unit 203 inputs the learning data generated by the teaching data execution unit 201 and stored in the first storage unit 205, that is, the captured image and the grip portion movement amount data.

Moreover, the learning result data stored in the second storage unit 206 generated by the learning processing of the learning processing unit 202, that is, the teaching data set including the captured image and the data set of the behavior rule (a movement trajectory of the grip position and the like) is input.

The feedback information generation unit 203 generates feedback information for the user (operator) on the basis of these input data and outputs the feedback information to the output unit (display unit) 204.

The feedback information generated by the feedback information generation unit 203 is the numerical feedback information or the visual feedback information described above.

The numerical feedback information and the visual feedback information generated by the feedback information generation unit 203 are the following pieces of information.

(1) Numerical feedback information

Evaluation value of teaching data executed by user (2) Visual feedback information (2a) Score graph display data (2b) High score region instruction data (2c) Score corresponding color display data (2d) Identification graph data of similar teaching data (2e) Teaching data-corresponding trajectory data Details of each of these pieces of information are as described above with reference to FIGS. 10 to 18.

The feedback information generated by the feedback information generation unit 203 is displayed on the output unit (display unit) 204.

For example, the data described above with reference to FIGS. 10 to 18 and the display data described above with reference to FIG. 19 are displayed.

The user (operator) confirms the evaluation of the executed teaching data by viewing the feedback information generated by the feedback information generation unit 203 and displayed on the output unit (display unit) 204. Moreover, a mode of necessary teaching data (such as a trajectory of the grip portion of the robot) is confirmed, and the robot is operated using newly necessary teaching data in the teaching data execution unit 201 according to these confirmation results.

By repeating these processing, it is possible to generate an effective leak-free teaching data set.

Note that, in the configuration of the information processing device 200 illustrated in FIG. 20, the camera 211 of the teaching data execution unit 201 may be attached to the simple teaching tool or the robot and may be configured separately from the information processing device 200.

The output unit 204 can also use a terminal such as a smartphone of the user as described above with reference to FIG. 19, and can be configured separately from the information processing device 200.

7. Sequences of Processing Executed by Information Processing Device According to Present Disclosure Next, sequences of processing executed by the information processing device according to the present disclosure will be described.

A sequence of processing executed by the information processing device of the present disclosure, for example, the information processing device 200 illustrated in FIG. 20 will be described with reference to the flowchart illustrated in FIG. 21.

Note that processing according to the flowchart can be executed, for example, according to a program stored in the storage unit of the data processing unit of the information processing device 200. For example, the processing can be executed as a program execution process by a processor such as a CPU having a program execution function.

Hereinafter, processes of respective steps of the flow illustrated in FIG. 21 will be described.

(Step S101)

First, in step S101, the user operates the simple teaching tool (or robot) according to the teaching data, and the data processing unit of the information processing device executes analysis processing of the motion information to generate learning data.

This processing is processing executed by the teaching data execution unit 201 of the information processing device 200 described above with reference to FIG. 20.

A user (operator) operates the simple teaching tool or the robot using the teaching data. A camera is attached to the simple teaching tool or the robot, and continuous images during the operation state by the user are captured.

The camera-captured image is input to the image analysis unit 212 described with reference to FIG. 20, and the image analysis unit 212 calculates the position and the movement amount of the simple teaching tool or the grip portion of the robot by analyzing the camera-captured image, and stores the captured image, the position of the grip portion, and the movement amount data in the first storage unit as learning data.

(Step S102)

Next, in step S102, the data processing unit of the information processing device executes learning processing using the learning data.

This processing is processing executed by the learning processing unit 202 of the information processing device 200 described above with reference to FIG. 20.

The learning processing unit 202 executes learning processing using learning data (captured image and grip portion movement amount data) generated by the teaching data execution unit 201 of the information processing device 200 and stored in the first storage unit 205.

The learning result data generated as a result of the learning processing in the learning processing unit 202 is a teaching data set, that is, a teaching data set including a captured image and a data set of a behavior rule (such as a movement trajectory of a grip position), and this data is stored in the second storage unit 206.

(Steps S103 and S104)

Next, in steps S103 and S104, the data processing unit of the information processing device collects the teaching data applied to the learning data generation processing and the teaching data set as the learning result, executes evaluation processing of the teaching data applied to the learning data generation processing, and performs generation processing of feedback information such as a score, for example.

This processing is processing executed by the feedback information generation unit 203 of the information processing device 200 described above with reference to FIG. 20.

The feedback information generation unit 203 inputs the learning data generated by the teaching data execution unit 201 and stored in the first storage unit 205, that is, the captured image and the grip portion movement amount data.

Moreover, the learning result data stored in the second storage unit 206 generated by the learning processing of the learning processing unit 202, that is, the teaching data set including the captured image and the data set of the behavior rule (a movement trajectory of the grip position and the like) is input.

The feedback information generation unit 203 generates feedback information for the user (operator) on the basis of the input data.

The feedback information generated by the feedback information generation unit 203 is the numerical feedback information or the visual feedback information described above.

That is, each of the following pieces of information is used.

(1) Numerical feedback information
Evaluation value of teaching data executed by user
(2) Visual feedback information
(2a) Score graph display data
(2b) High score region instruction data
(2c) Score corresponding color display data
(2d) Identification graph data of similar teaching data
(2e) Teaching data-corresponding trajectory data Details of each of these pieces of information are as described above with reference to FIGS. 10 to 18.

(Step S105)

Next, in step S105, the data processing unit of the information processing device presents the feedback information generated in step S104 to the user.

This processing is processing executed by the feedback information generation unit 203 and the output unit (display unit) 204 of the information processing device 200 described above with reference to FIG. 20.

The feedback information generation unit 203 outputs the feedback information generated in step S104 to the output unit (display unit) 204 to present to the user.

The feedback information to be output to the output unit (display unit) 204 is the numerical feedback information or the visual feedback information described above, and is each of the following information.

(1) Numerical feedback information
Evaluation value of teaching data executed by user
(2) Visual feedback information
(2a) Score graph display data
(2b) High score region instruction data
(2c) Score corresponding color display data
(2d) Identification graph data of similar teaching data
(2e) Teaching data-corresponding trajectory data (Step S106)

The determination processing in the next step S106 is determination processing by the user (operator) who has confirmed the feedback information output to the output unit (display unit) 204.

The user (operator) confirms the evaluation of the teaching data currently executed by the user by viewing the feedback information generated by the feedback information generation unit 203 and displayed on the output unit (display unit) 204. Moreover, a mode of necessary teaching data (such as a trajectory of a grip portion of the robot) is confirmed, and it is determined whether or not a process of generating a new teaching data set is necessary.

In a case where it is determined that the process of generating a new teaching data set is not necessary, the process is ended.

On the other hand, in a case where it is determined that the process of generating a new teaching data set is necessary, the process proceeds to step S107.

(Step S107)

In step S106, in a case where the user determines that it is necessary to generate a new teaching data set by viewing the feedback information displayed on the output unit (display unit) 204, the process proceeds to step S107 and the following processing is executed.

That is, teaching data for generating a new teaching data set determined to be necessary is generated by viewing the feedback information, the process returns to step S101, and learning processing to which the generated new teaching data is applied is executed.

These processes are repeated, and when it is finally determined in step S106 that the process of generating a new teaching data set is not necessary, the process ends.

With such processing, it is possible to generate an effective leak-free teaching data set.

Figure 21:
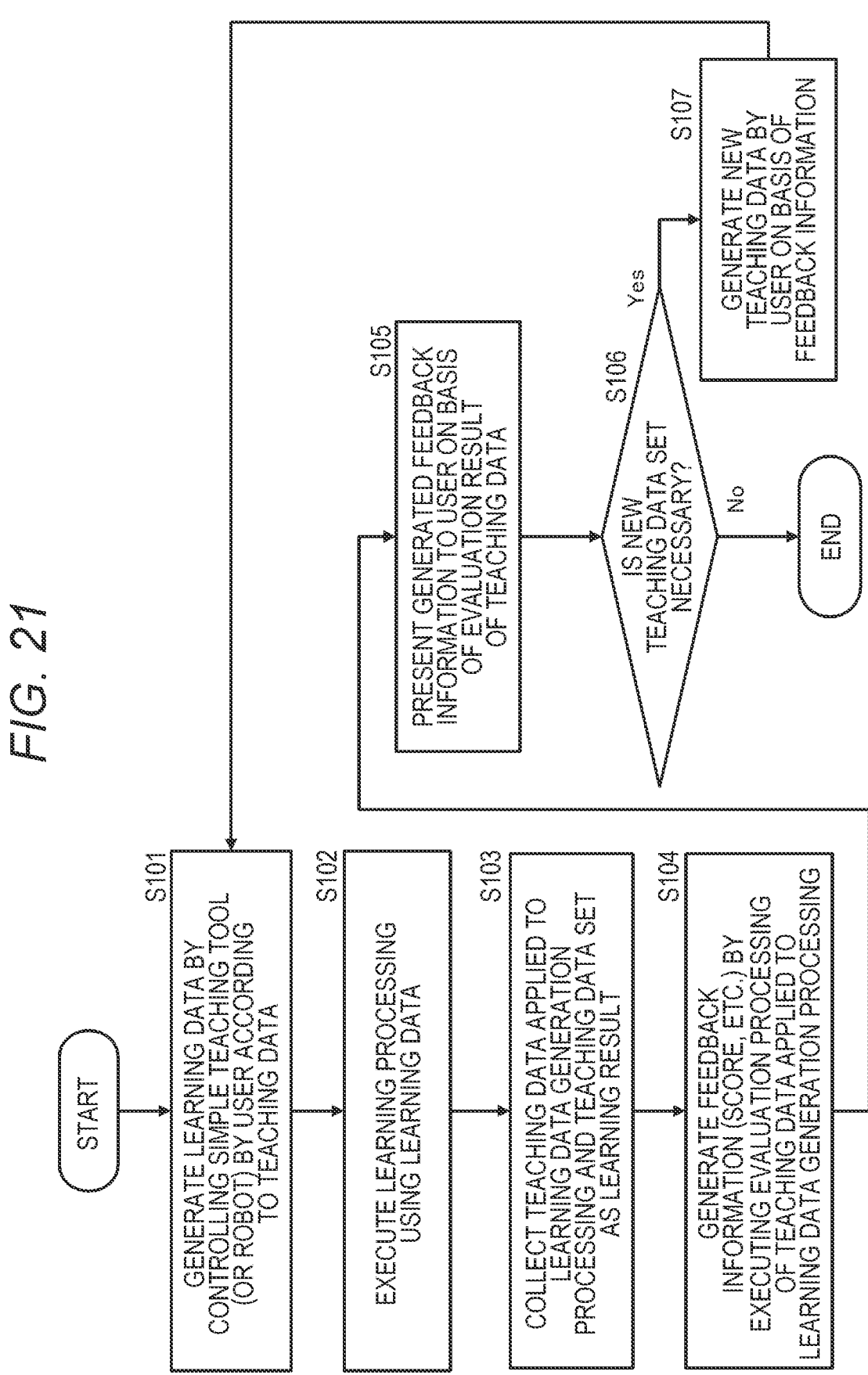
FIG. 21 is a diagram illustrating a flowchart for explaining a sequence of processing executed by the information processing device of the present disclosure.

The flow illustrated in FIG. 21 is a sequence in which feedback data is generated at the time of execution of learning processing to which teaching data is applied, and learning processing using new teaching data is executed with reference to feedback information.

In addition to such a processing sequence, for example, the processing of the present disclosure can be executed as a processing sequence in which the robot is actually controlled using the learning result by the learning processing, the control result is evaluated, and the learning processing is further resumed according to the evaluation result.

This processing sequence will be described with reference to the flowchart illustrated in FIG. 22.

Hereinafter, processes of respective steps of the flow illustrated in FIG. 22 will be described.

(Step S201)

First, in step S201, the user operates the simple teaching tool (or robot) according to the teaching data, and the data processing unit of the information processing device executes analysis processing of the motion information to generate learning data.

This processing is processing executed by the teaching data execution unit 201 of the information processing device 200 described above with reference to FIG. 20.

A user (operator) operates the simple teaching tool or the robot using the teaching data. A camera is attached to the simple teaching tool or the robot, and continuous images during the operation state by the user are captured.

The camera-captured image is input to the image analysis unit 212 described with reference to FIG. 20, and the image analysis unit 212 calculates the position and the movement amount of the simple teaching tool or the grip portion of the robot by analyzing the camera-captured image, and stores the captured image, the position of the grip portion, and the movement amount data in the first storage unit as learning data.

(Step S202)

Next, in step S202, the data processing unit of the information processing device executes learning processing using the learning data.

This processing is processing executed by the learning processing unit 202 of the information processing device 200 described above with reference to FIG. 20.

The learning processing unit 202 executes learning processing using learning data (captured image and grip portion movement amount data) generated by the teaching data execution unit 201 of the information processing device 200 and stored in the first storage unit 205.

The learning result data generated as a result of the learning processing in the learning processing unit 202 is a teaching data set, that is, a teaching data set including a captured image and a data set of a behavior rule (such as a movement trajectory of a grip position), and this data is stored in the second storage unit 206.

(Step S203)

Next, in step S203, the data processing unit of the information processing device 200 actually controls the robot using the learning result data generated in step S202.

Note that this processing is not illustrated as the configuration of the information processing device 200 illustrated in FIG. 20, but is executed by a robot drive unit which is a component of the information processing device 200.

The robot drive unit controls the robot using the learning result data stored in the second storage unit 206, that is, the teaching data set including the captured image and the data set of the behavior rule (movement trajectory of the grip position and the like).

For example, the robot is caused to execute gripping processing of a component at various positions by control based on the learning result data.

(Step S204)

Next, in step S204, the data processing unit of the information processing device 200 determines whether or not the robot control to which the learning result data in step S203 is applied is good, that is, whether or not the robot performance is equal to or higher than the specified performance.

A case where it is determined that the robot performance is equal to or higher than the specified performance, the process ends. That is, it is determined that the learning processing for generating a new teaching data set is unnecessary, and the process is ended.

On the other hand, in a case where it is determined that the robot performance is not equal to or higher than the specified performance, the process proceeds to step S205. That is, it is determined that learning processing for generating a new teaching data set is necessary, and the processing of step S205 and subsequent steps is executed.

(Steps S205 and S206)

Next, in steps S205 and S206, the data processing unit of the information processing device collects the teaching data applied to the learning data generation processing and the teaching data set as the learning result, executes evaluation processing of the teaching data applied to the learning data generation processing, and performs generation processing of feedback information such as a score, for example.

This processing is processing executed by the feedback information generation unit 203 of the information processing device 200 described above with reference to FIG. 20.

The feedback information generation unit 203 inputs the learning data generated by the teaching data execution unit 201 and stored in the first storage unit 205, that is, the captured image and the grip portion movement amount data.

Moreover, the learning result data stored in the second storage unit 206 generated by the learning processing of the learning processing unit 202, that is, the teaching data set including the captured image and the data set of the behavior rule (a movement trajectory of the grip position and the like) is input.

The feedback information generation unit 203 generates feedback information for the user (operator) on the basis of the input data.

The feedback information generated by the feedback information generation unit 203 is the numerical feedback information or the visual feedback information described above.

That is, each of the following pieces of information is used.

(1) Numerical feedback information
Evaluation value of teaching data executed by user
(2) Visual feedback information
(2a) Score graph display data
(2b) High score region instruction data
(2c) Score corresponding color display data (2d) Identification graph data of similar teaching data (2e) Teaching data-corresponding trajectory data Details of each of these pieces of information are as described above with reference to FIGS. 10 to 18.

(Step S207)

Next, in step S207, the data processing unit of the information processing device presents the feedback information generated in step S206 to the user.

This processing is processing executed by the feedback information generation unit 203 and the output unit (display unit) 204 of the information processing device 200 described above with reference to FIG. 20.

The feedback information generation unit 203 outputs the feedback information generated in step S206 to the output unit (display unit) 204 to present to the user.

The feedback information to be output to the output unit (display unit) 204 is the numerical feedback information or the visual feedback information described above, and is each of the following information.

(1) Numerical feedback information

Evaluation value of teaching data executed by user (2) Visual feedback information (2a) Score graph display data (2b) High score region instruction data (2c) Score corresponding color display data (2d) Identification graph data of similar teaching data (2e) Teaching data-corresponding trajectory data (Step S208)

Next, in step S208, the user generates teaching data for generating a new teaching data set determined to be necessary by viewing the feedback information displayed on the output unit (display unit) 204, and returns to step S201 to execute learning processing to which the generated new teaching data is applied.

The processing is repeated, and when it is finally determined in step S204 that the performance of the robot is equal to or higher than the specified performance, the processing ends.

With such processing, it is possible to generate an effective leak-free teaching data set, and it is possible to improve the robot performance to the specified performance or more.

8. Hardware Configuration Example of Information Processing Device of Present Disclosure Next, an example of a hardware configuration of the information processing device according to the present disclosure will be described.

Figure 23:
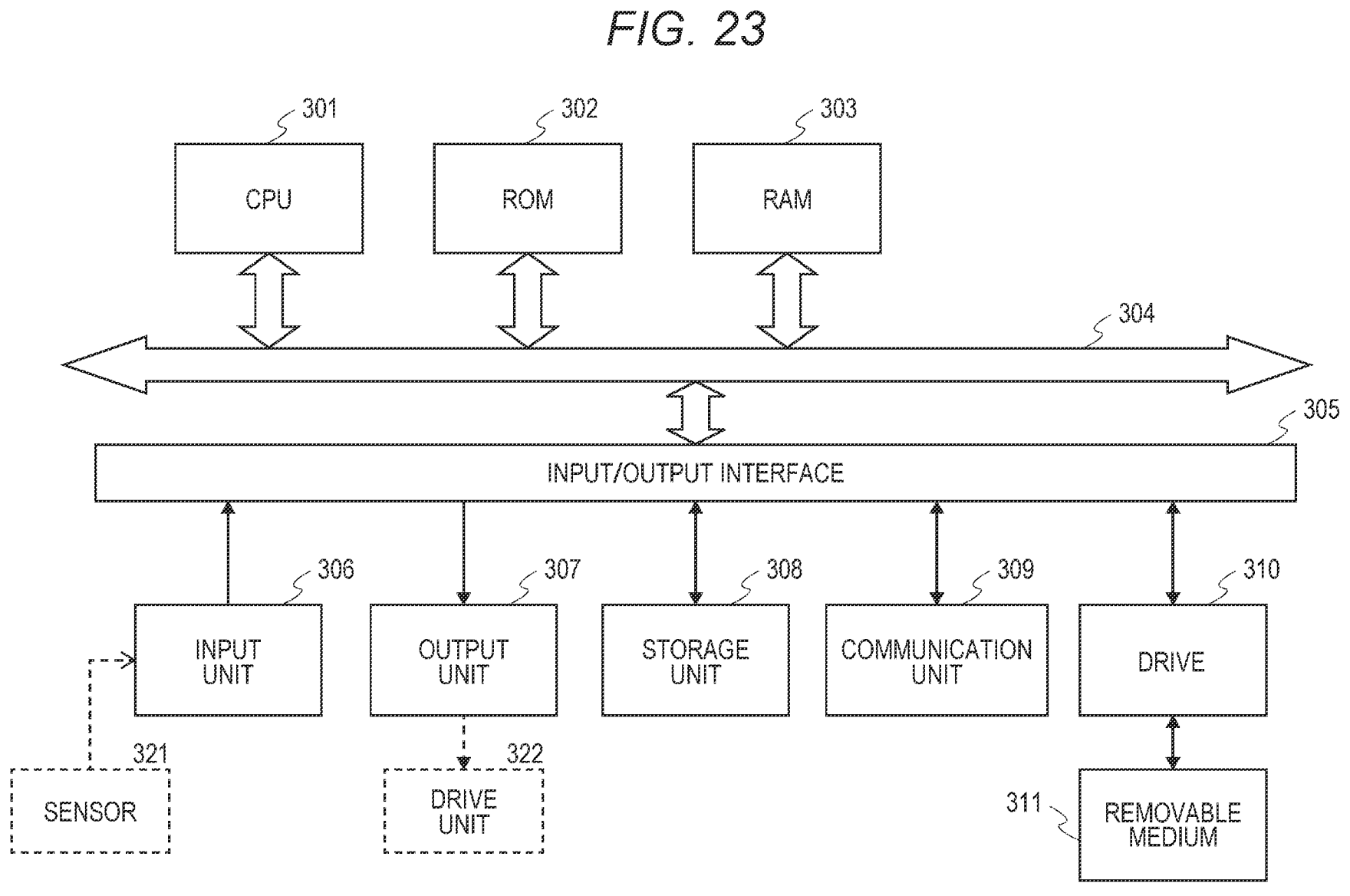

FIG. 23 is a block diagram illustrating an example of a hardware configuration of the information processing device of the present disclosure.

A central processing unit (CPU) 301 functions as a data processing unit that performs various types of processing according to a program stored in a read only memory (ROM) 302 or a storage unit 308. For example, processing according to the sequences described in the above-described examples is performed. A random access memory (RAM) 303 stores programs, data, and the like to be performed by the CPU 301. The CPU 301, the ROM 302, and the RAM 303 are connected to each other by a bus 304.

The CPU 301 is connected to an input/output interface 305 via the bus 304, and the input/output interface 305 is connected to an input unit 306 including various switches, a keyboard, a touch panel, a mouse, a microphone, and further a status data acquisition unit of a user input unit, a camera, and various sensors 321 such as LiDAR, and the like, and an output unit 307 including a display, a speaker, and the like.

Furthermore, the output unit 307 also outputs drive information for a drive unit 322 that drives a robot or the like.

The CPU 301 inputs commands, status data, and the like inputted from the input unit 306, executes various kinds of processing, and outputs processing results to, for example, the output unit 307.

The storage unit 308 connected to the input/output interface 305 includes, for example, a flash memory, a hard disk, or the like, and stores a program executed by the CPU 301 or various kinds of data. A communication unit 309 functions as a transmission/reception unit for data communication via a network such as the Internet or a local area network, and communicates with an external device.

Furthermore, in addition to the CPU, a graphics processing unit (GPU) may be provided as a dedicated processing unit for image information and the like input from the camera.

A drive 310 connected to the input/output interface 305 drives a removable medium 311 such as a magnetic disk, an optical disk, a magneto-optical disk, or a semiconductor memory such as a memory card, and performs data recording and reading.

9. Summary of Configuration of Present Disclosure

As described above, the embodiments of the present disclosure have been described in detail with reference to particular embodiments. However, it is self-evident that a person skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present specification can have the following configurations.

(1) An information processing device including:

a teaching data execution unit that generates, as learning data, a camera-captured image corresponding to movement of a robot by a user operation based on teaching data and movement position information of the robot;

a learning processing unit that executes machine learning processing by inputting learning data generated by the teaching data execution unit and generates a teaching data set including correspondence data between an image and a behavior rule of a robot as learning result data; and a feedback information generation unit that inputs learning data generated by the teaching data execution unit and learning result data generated by the learning processing unit, executes evaluation of teaching data applied to the user operation executed in the teaching data execution unit, generates feedback information based on an evaluation result, and outputs the feedback information to an output unit.

(2) The information processing device according to (1), in which the feedback information generation unit is configured to as the feedback information, generate numerical feedback information including a score value corresponding to an evaluation value of teaching data applied to the user operation executed in the teaching data execution unit and output the numerical feedback information to an output unit.

(3) The information processing device according to (2), in which
the feedback information generation unit is configured to
as the numerical feedback information,
generate an n-th score value, where n is an integer of 2 or more and output the score value to an output unit.

(4) The information processing device according to (2) or (3), in which
the feedback information generation unit is configured to
as the numerical feedback information,
generate a rank corresponding to the score value and output the rank to an output unit.

(5) The information processing device according to any one of (2) to (4), in which
the feedback information generation unit is configured to
as the numerical feedback information,
generate a score indicating uncertainty of a behavior rule included in a teaching data set that is learning result data generated by the learning processing unit and output the score to an output unit.

(6) The information processing device according to any one of (2) to (5), in which
the feedback information generation unit is configured to
as the numerical feedback information,
generate a score indicating a prediction error that is a score corresponding to a difference between a movement position of a robot by a user operation based on the teaching data executed in the teaching data execution unit and a movement position of a robot predicted from a behavior rule included in the teaching data set generated by learning processing of the learning processing unit and output the score to an output unit.

(7) The information processing device according to any one of (2) to (6), in which
the feedback information generation unit is configured to
as the numerical feedback information,
generate a score indicating a degree of difference between teaching data applied to the user operation executed in the teaching data execution unit and an executed teaching data and output the score to an output unit.

(8) The information processing device according to any one of (1) to (7), in which
the feedback information generation unit is configured to as the feedback information,
generate visual feedback information including an image or a graph generated on the basis of an evaluation result of teaching data applied to a user operation executed in the teaching data execution unit, and output the visual feedback information to an output unit.

(9) The information processing device according to (8), in which
the feedback information generation unit is configured to
as the visual feedback information,
generate score graph display data obtained by graphing scores corresponding to evaluation values of teaching data applied to a user operation executed in the teaching data execution unit and output the score graph display data to an output unit.

(10) The information processing device according to (8) or (9), in which
the feedback information generation unit is configured to
as the visual feedback information,
generate high score region instruction data indicating a region having a high score corresponding to an evaluation value of teaching data applied in the teaching data execution unit on the camera-captured image and output the high score region instruction data to an output unit.

(11) The information processing device according to any one of (8) to (10), in which
the feedback information generation unit is configured to:
as the visual feedback information,
generate and output a color-changed image of the camera-captured image; and
generate and output a color-changed image obtained by changing the camera-captured image to a different color according to a score corresponding to an evaluation value of teaching data applied to a user operation executed in the teaching data execution unit.

(12) The information processing device according to any one of (8) to (11), in which
the feedback information generation unit is configured to
as the visual feedback information,
generate identification graph data indicating similarity or a degree of difference between teaching data applied to a user operation executed in the teaching data execution unit and teaching data executed in a past and output the identification graph data to an output unit.

(13) The information processing device according to any one of (8) to (12), in which
the feedback information generation unit is configured to
as the visual feedback information,
generate identification graph data indicating similarity or a degree of difference between latent feature data generated by compressing feature data acquired from a camera-captured image corresponding to a motion of a robot based on teaching data applied to a user operation executed in the teaching data execution unit and latent feature data generated by compressing feature data acquired from a camera-captured image corresponding to a motion of a robot based on teaching data executed in a past and output the identification graph data to an output unit.

(14) The information processing device according to any one of (8) to (13), in which
the feedback information generation unit is configured to
as the visual feedback information,
generate comparison data between a movement trajectory of a robot according to teaching data applied to a user operation executed in the teaching data execution unit and a movement trajectory of a robot according to teaching data executed in a past and output the comparison data to an output unit.

(15) An information processing method executed in an information processing device, the method including:
teaching data execution step of generating, by a teaching data execution unit, a camera-captured image corresponding to movement of a robot by a user operation based on teaching data and movement position information of the robot as learning data;
learning processing step of executing, by a learning processing unit, machine learning processing by inputting learning data generated by the teaching data execution unit and generating a teaching data set including correspondence data between an image and a behavior rule of a robot as learning result data; and
feedback information generation step of executing, by a feedback information generation unit, evaluation of teaching data applied to the user operation executed in the teaching data execution unit by inputting learning data generated by the teaching data execution unit and learning result data generated by the learning processing unit, generating feedback information based on an evaluation result, and outputting the feedback information to an output unit.

(16) A program for causing an information processing device to execute information processing, including:
teaching data execution step of causing a teaching data execution unit to generate, as learning data, a camera-captured image corresponding to movement of a robot by a user operation based on teaching data and movement position information of the robot;
learning processing step of causing a learning processing unit to execute machine learning processing by inputting learning data generated by the teaching data execution unit and to generate a teaching data set including correspondence data between an image and a behavior rule of a robot as learning result data; and
feedback information generation step of causing a feedback information generation unit to execute evaluation of teaching data applied to the user operation executed in the teaching data execution unit by inputting learning data generated by the teaching data execution unit and learning result data generated by the learning processing unit, to generate feedback information based on an evaluation result, and to output the feedback information to an output unit.

Note that a series of processes described in the specification can be executed by hardware, software, or a combined configuration of the both. In a case where processing by software is executed, a program in which a processing sequence is recorded can be installed and executed in a memory in a computer incorporated in dedicated hardware, or the program can be installed and executed in a general-purpose computer capable of executing various types of processing. For example, the program can be recorded in advance in a recording medium. In addition to being installed on a computer from a recording medium, the program can be received via a network such as a local area network (LAN) or the Internet and installed on a recording medium such as an internal hard disk or the like.

Furthermore, the various types of processing described in the specification are not only performed in time series according to the description, but may be performed in parallel or individually according to the processing capability of the apparatus that performs the processing or as necessary. Furthermore, in the present specification, a system is a logical set configuration of a plurality of devices, and is not limited to a system in which devices of configurations are in the same housing.

INDUSTRIAL APPLICABILITY

As described above, according to the configuration of one embodiment of the present disclosure, in the configuration for performing the learning processing using the teaching data, the device and the method for presenting the evaluation score of the teaching data and the necessary teaching data to the user in an easy-to-understand manner are realized, and the efficient learning processing and the improvement of the robot performance can be performed.

Specifically, for example, the teaching data execution unit generates, as the learning data, a camera-captured image corresponding to the motion of the robot by the user operation based on the teaching data and the movement position information of the robot, the learning processing unit inputs the learning data generated by the teaching data execution unit to execute the machine learning and generates the teaching data set including the image and the robot behavior rule as the learning result data, the feedback information generation unit inputs the learning data generated by the teaching data execution unit and the learning result data generated by the learning processing unit to execute the evaluation of the teaching data, and generates and outputs the numerical feedback information and the visual feedback information based on the evaluation result.

According to this configuration, in the configuration for performing the learning processing using the teaching data, the device and the method for presenting the evaluation score of the teaching data and the necessary teaching data to the user in an easy-to-understand manner are realized, and efficient learning processing and improvement of robot performance can be performed.

REFERENCE SIGNS LIST

100 Robot
101 Grip portion
102 Arm portion
105 Camera
120 User
140 Teaching data execution unit
150 Learning data
160 Learning processing unit
165 Learning result data
170 Feedback information generation unit
180 Output unit (display unit)
200 Information processing device
201 Teaching data execution unit
202 Learning processing unit
203 Feedback information generation unit
204 Output unit (display unit)
205 First storage unit
206 Second storage unit
211 Camera
212 Image analysis unit
231 Teaching data execution unit generation data
232 Teaching data set
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. An information processing device, comprising:
a processor configured to:
generate, as learning data, a camera-captured image corresponding to a movement of a robot, wherein the movement of the robot is by a user operation, and the movement is based on teaching data and movement position information of the robot;
execute a machine learning process based on input of the learning data;
generate a teaching data set including correspondence data between the camera-captured image and a behavior rule of the robot as learning result data;
control input of the learning data and the learning result data;

execute evaluation of the teaching data applied to the user operation;

generate, as feedback information, visual feedback information including one of a specific image or a graph, wherein the specific image or the graph is generated based on an evaluation result of the teaching data applied to the user operation, and the feedback information is generated based on the evaluation result;

generate, as the visual feedback information, one of:

score graph display data obtained based on graph of scores corresponding to an evaluation value of the teaching data applied to the user operation, high score region instruction data indicating a region having a high score corresponding to the evaluation value of the teaching data, a color-changed image of the camera-captured image, first identification graph data indicating similarity or a degree of difference between the teaching data applied to the user operation and teaching data executed in a past, second identification graph data indicating similarity or a degree of difference between:

latent feature data generated by compression of feature data acquired from the camera-captured image corresponding to the movement of the robot using the teaching data applied to the user operation, and latent feature data generated by compressing feature data acquired from the camera-captured image corresponding to the movement of the robot using the teaching data executed in the past, or comparison data between a movement trajectory of the robot using the teaching data applied to the user operation and a movement trajectory of the robot using the teaching data executed in the past; and control output of the visual feedback information to an output unit.

2. The information processing device according to claim 1, wherein the processor is further configured to:

generate, as the feedback information, numerical feedback information including a score value corresponding to the evaluation value of the teaching data applied to the user operation; and control output of the numerical feedback information to the output unit.

3. The information processing device according to claim 2, wherein the processor is further configured to;

generate, as the numerical feedback information, an n-th score value, where n is an integer of at least 2; and control output of the n-th score value to the output unit.

4. The information processing device according to claim 2, wherein the processor is further configured to:

generate, as the numerical feedback information, a rank corresponding to the score value; and control output of the rank to the output unit.

5. The information processing device according to claim 2, wherein the processor is further configured to:

generate, as the numerical feedback information, a first score indicating uncertainty of the behavior rule included in the teaching data set that is the learning result data; and control output of the generated first score to the output unit.

6. The information processing device according to claim 2, wherein the processor is further configured to:

generate, as the numerical feedback information, a second score indicating a prediction error that is a score corresponding to a difference between a first movement position of the robot and a second movement position of the robot, wherein the first movement position is based on the movement of the robot by the user operation, and the second movement position of the robot is predicted from the behavior rule included in the generated teaching data set; and control output of the generated second score to the output unit.

7. The information processing device according to claim 2, wherein the processor is further configured to:

generate, as the numerical feedback information, a third score indicating a degree of difference between the teaching data applied to the user operation and an executed teaching data; and control output of the generated third score to the output unit.

8. An information processing method executed in an information processing device, the information processing method comprising:

generating, by a processor, a camera-captured image corresponding to a movement of a robot, wherein the movement of the robot is by a user operation, and the movement is based on teaching data and movement position information of the robot as learning data;

executing, by the processor, a machine learning process based on input of the learning data;

generating, by the processor, a teaching data set including correspondence data between the camera-captured image and a behavior rule of the robot as learning result data;

controlling, by the processor, input of the learning data and the learning result data;

executing, by the processor, evaluation of the teaching data applied to the user operation;

generating, by the processor, visual feedback information including one of a specific image or a graph, wherein the specific image or the graph is generated based on an evaluation result of the teaching data applied to the user operation as feedback information, and the feedback information is generated based on the evaluation result;

generating, as the visual feedback information by the processor, one of:

score graph display data obtained based on graph of scores corresponding to an evaluation value of the teaching data applied to the user operation, high score region instruction data indicating a region having a high score corresponding to the evaluation value of the teaching data, a color-changed image of the camera-captured image, first identification graph data indicating similarity or a degree of difference between the teaching data applied to the user operation and teaching data executed in a past, second identification graph data indicating similarity or a degree of difference between:

latent feature data generated by compressing feature data acquired from the camera-captured image corresponding to the movement of the robot using the teaching data applied to the user operation, and latent feature data generated by compressing feature data acquired from the camera-captured image corresponding to the movement of the robot using the teaching data executed in the past, or comparison data between a movement trajectory of the robot using the teaching data applied to the user operation and a movement trajectory of the robot using the teaching data executed in the past; and controlling, by the processor, output of the visual feedback information to an output unit.

9. A non-transitory computer-readable medium having stored thereon, computer-executable instructions which, when executed by a computer, cause the computer to execute operations, the operations comprising:

generating, as learning data, a camera-captured image corresponding to a movement of a robot, wherein the movement of the robot is by a user operation, and the movement is based on teaching data and movement position information of the robot;

executing a machine learning process based on input of the learning data;

generating a teaching data set including correspondence data between the camera-captured image and a behavior rule of the robot as learning result data;

controlling input of the learning data and the learning result data;

executing evaluation of the teaching data applied to the user operation;

generating, as feedback information, visual feedback information including one of a specific image or a graph, wherein the specific image or the graph is generated based on an evaluation result of the teaching data applied to the user operation, and the feedback information is generated based on the evaluation result;

generating, as the visual feedback information, one of:

score graph display data obtained based on graph of scores corresponding to an evaluation value of the teaching data applied to the user operation, high score region instruction data indicating a region having a high score corresponding to the evaluation value of the teaching data, a color-changed image of the camera-captured image, first identification graph data indicating similarity or a degree of difference between the teaching data applied to the user operation and teaching data executed in a past, second identification graph data indicating similarity or a degree of difference between:

latent feature data generated by compressing feature data acquired from the camera-captured image corresponding to the movement of the robot using the teaching data applied to the user operation, and latent feature data generated by compressing feature data acquired from the camera-captured image corresponding to the movement of the robot using the teaching data executed in the past, or comparison data between a movement trajectory of the robot using the teaching data applied to the user operation and a movement trajectory of the robot using the teaching data executed in the past; and outputting the visual feedback information to an output unit.

\* \* \* \* \*